US006097393A

United States Patent [19]
Prouty, IV et al.

[11] Patent Number: 6,097,393
[45] Date of Patent: Aug. 1, 2000

[54] COMPUTER-EXECUTED, THREE-DIMENSIONAL GRAPHICAL RESOURCE MANAGEMENT PROCESS AND SYSTEM

[75] Inventors: Dwight Prouty, IV, Foxton; Scott R. Bell, Aurora, both of Colo.

[73] Assignee: The Takshele Corporation, Denver, Colo.

[21] Appl. No.: 08/706,812

[22] Filed: Sep. 3, 1996

[51] Int. Cl.[7] .................................................. G06F 3/00
[52] U.S. Cl. ........................................ 345/419; 345/430
[58] Field of Search .................................. 345/419, 420, 345/425, 429, 430

[56] References Cited

U.S. PATENT DOCUMENTS 5,528,735  6/1996  Strasnick et al. .

FOREIGN PATENT DOCUMENTS 0 694 829  1/1996  European Pat. Off. .
WO 94/08309  4/1994  WIPO .

OTHER PUBLICATIONS

"A Spacial Graphical Man–machine Interface"; Proceedings of IFIP Congress 80, Sep. 6, 1980; Tokyo, Japan; pp. 1039–1044.
"Information Visualization Using 3D Interactive Animation"; Communications of the Association for Computing Machinery; Apr. 1, 1993; vol. 36, NR. 4; pp. 57–71.
"Super Maze Wars"; MAC Format; Feb. 9, 1994; Bath, U.K.; pp. 40–41.
"Iron Helix"; MAC Format; Oct. 1993, Bath, U.K.; pp. 92–93.

*Primary Examiner*—Cliff N. Vo
*Attorney, Agent, or Firm*—John R. Ley

[57] ABSTRACT

A three-dimensional space is defined and displayed in a main window of a computer display. Navigation through the three-dimensional space occurs by user inputs correlated to the three-dimensional display of the space from the user's point of view within the space. Navigation also occurs from user inputs correlated to a secondary two-dimensional display of the user's position relative to two dimensions of the three-dimensional space. A three-dimensional environment defined by the space displays computer resource icons. Activation of a computer resource is achieved by navigation through the three-dimensional environment and selection of a displayed resource icon through manipulation of an input device. Resource icons may be displayed in the environment in various predetermined three-dimensional configurations to signify hierarchical relationships between the associated computer resources. A state defined by the position and point of view of the user within the three-dimensional environment, in combination with the user-defined arrangement of resource icons within the environment, may be saved and recalled for later use.

30 Claims, 12 Drawing Sheets

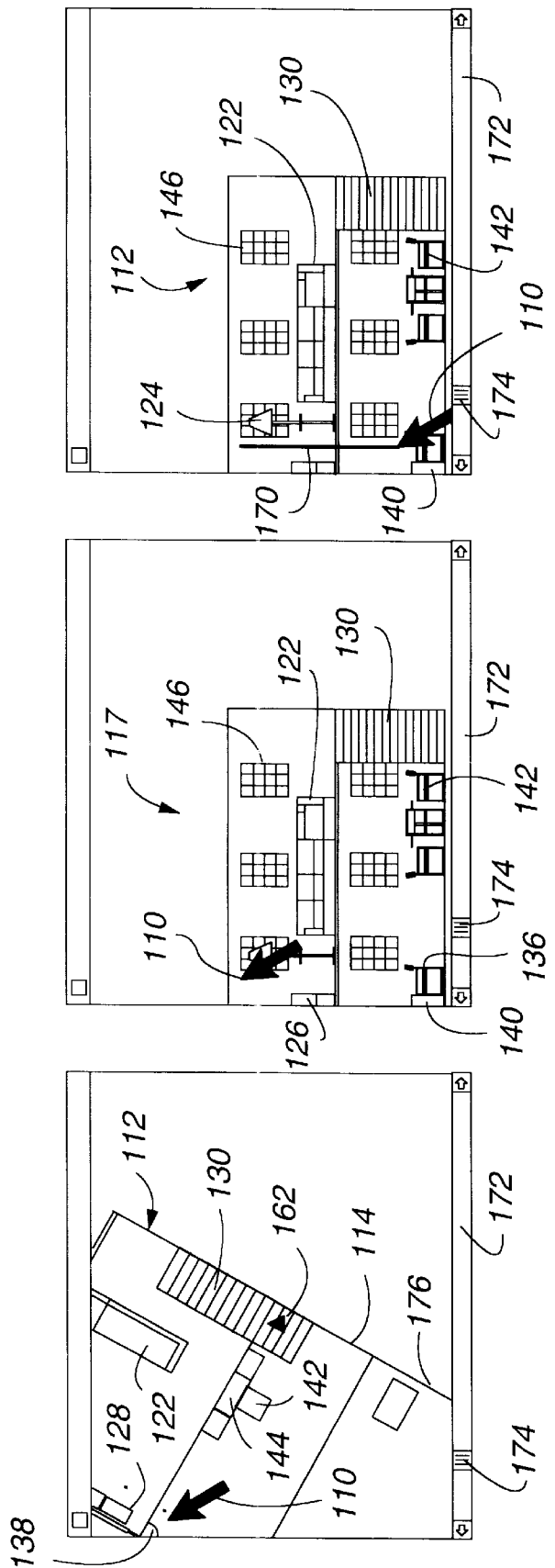

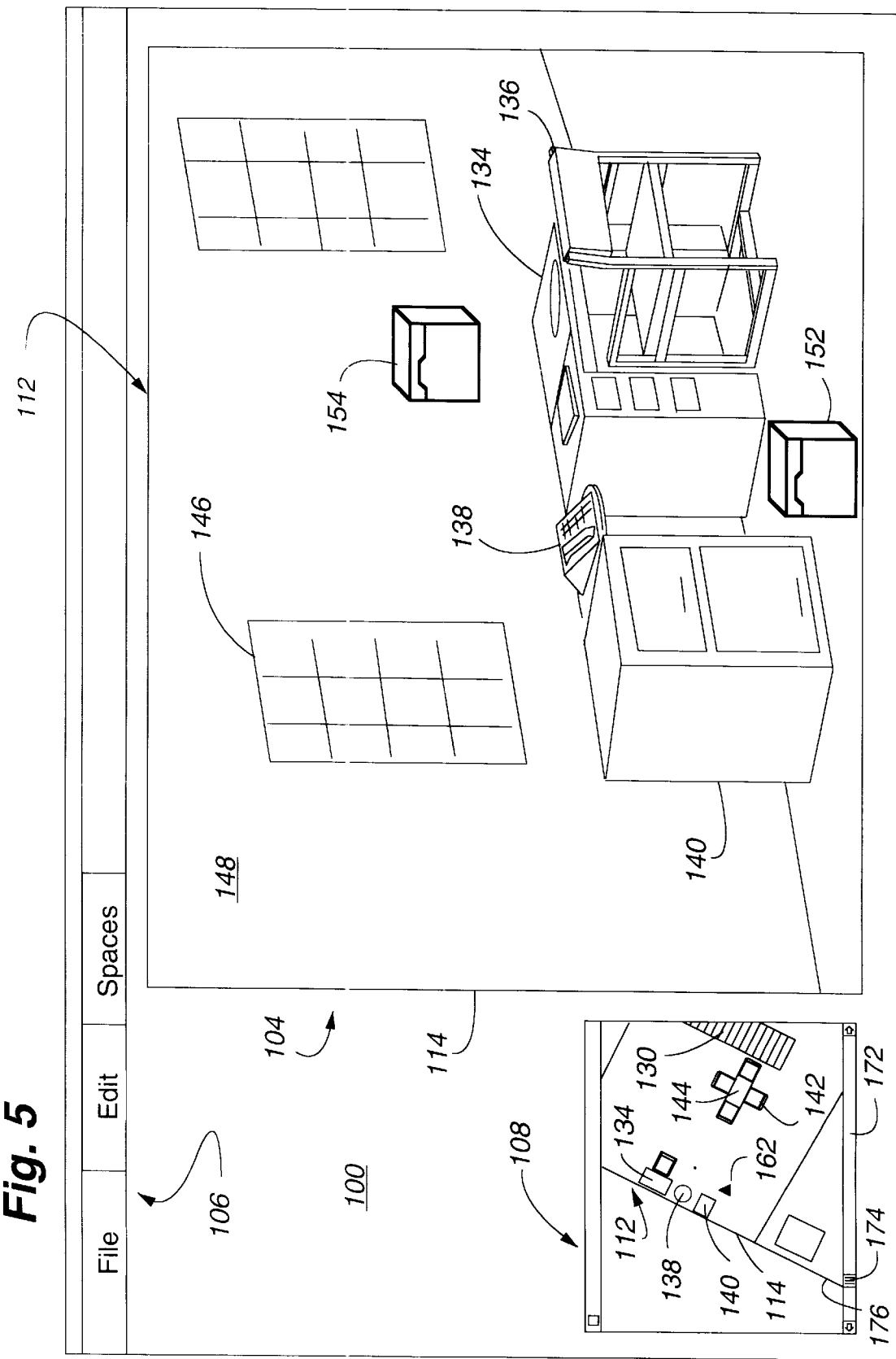

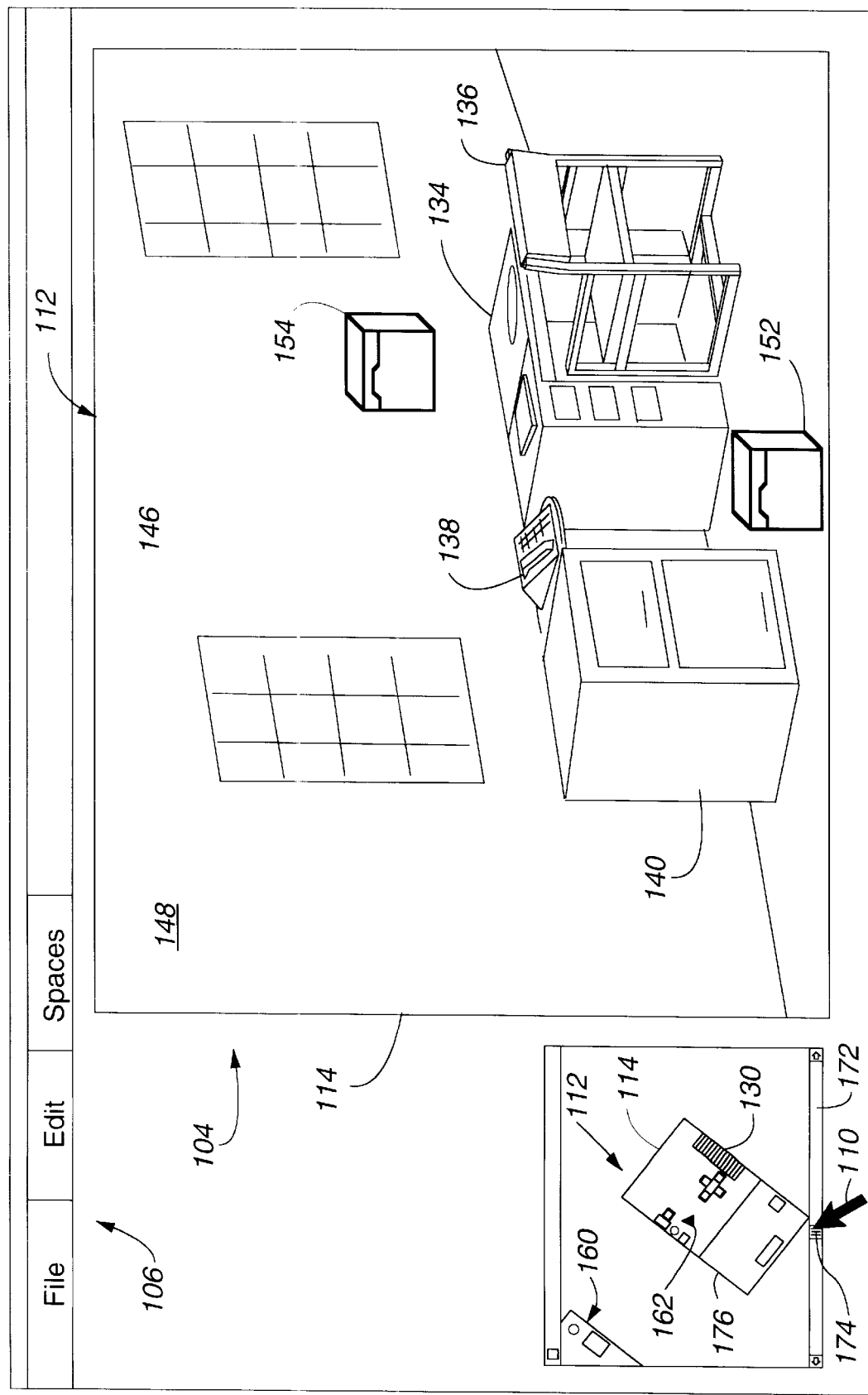

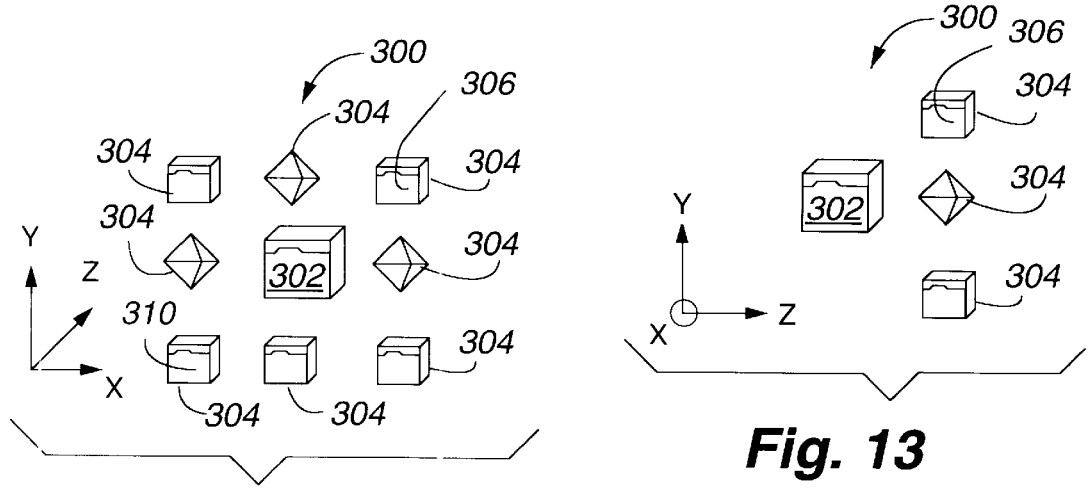
Fig. 12
Fig. 13
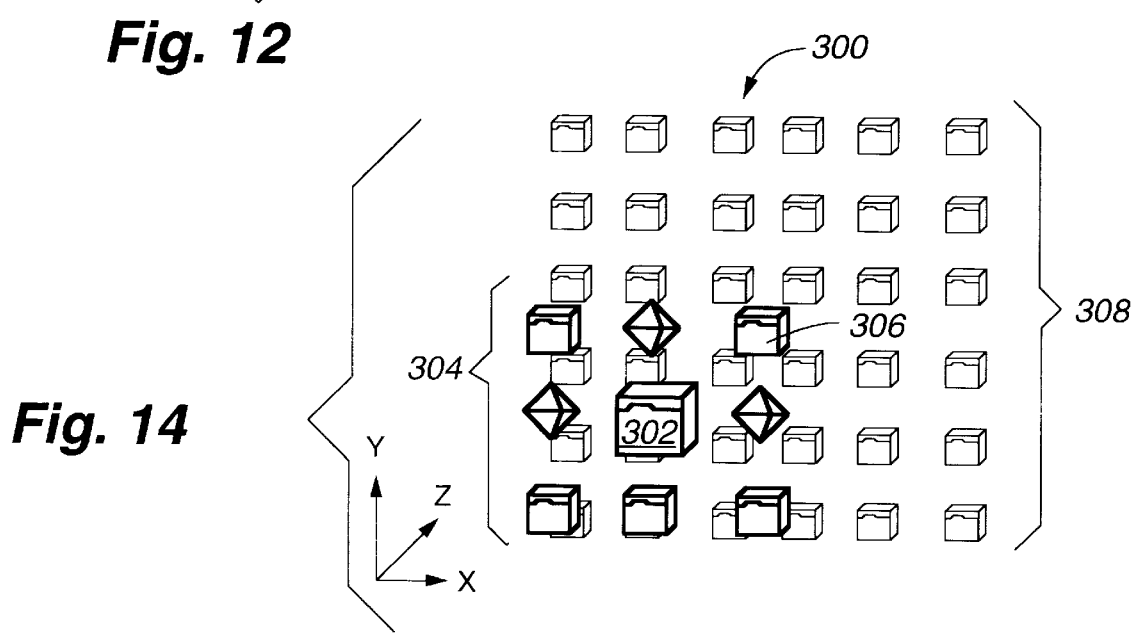
Fig. 14
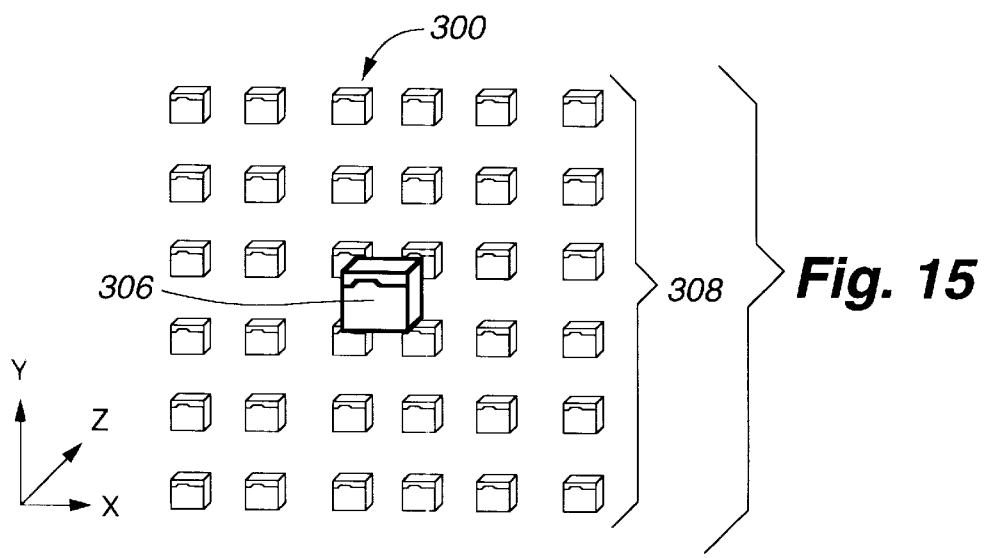
Fig. 15

COMPUTER-EXECUTED, THREE-DIMENSIONAL GRAPHICAL RESOURCE MANAGEMENT PROCESS AND SYSTEM

CODE APPENDIX

Included with the application for this U.S. patent is a copy of relevant portions of the computer code which embodies this invention. The information included in this Appendix is incorporated herein by this reference. All code is written in C++ within the framework of PowerPlant™, an application framework included with Metrowerksm Codewarrior™. The versions used are those included with the CW9 release from Metrowerks™. The three-dimensional engine used is Quickdraw 3D v1.06 from Apple Computer™ (provided royalty free from Apple Computer™) obtainable directly by request or by downloading from <http://quickdraw3d.apple.com> via the Internet. The framework, PowerPlant™, is a standard Macintosh™ application framework and its analogies exist in many other forms (e.g., The Think Class Library from Symantec™ and MacApp™ from Apple Computer™). While the preferred combination of PowerPlant™ and Quickdraw 3D™ are utilized within the code of the present invention, other comparable frameworks and three-dimensional engines could be used in their place.

FIELD OF THE INVENTION

This invention relates to a process and system, executed by programmed instructions operating a general purpose computer, for graphically managing computer objects, files and other resources represented by resource icons displayed in three dimensions on a two dimensional display. More particularly, the present invention relates a new and improved process and system for navigating in three-dimensional display, for organizing and presenting resources in a three-dimensional display, and for saving and recalling selected resources organized and presented in a unique three-dimensional display. The features of the present invention contribute to locating and managing large numbers of resources in an effective manner resulting from the compatible, harmonious and comfortable simile of the three-dimensional display relative to the normal, three-dimensional, human environment.

BACKGROUND OF THE INVENTION

The increased use of computers for business, personal and entertainment purposes, coupled with the ever-expanding numbers of computer programs available for use and the easy access to computer programs over telecommunication links such as the Internet, has dramatically increased the number of files, programs and other resources which the typical computer user accesses and uses. The numbers of resources, and the different sources of those resources has added to the complexity of selecting, maintaining and using those resources. Although more modern operating systems have attempted to alleviate some of these difficulties, the need to increase the ease of accessibility and management remains a primary deterrent to more effective use of widespread computer resources from a variety of different sources.

A modern approach to managing larger numbers of resources and increasing the convenience of doing so is a graphical display of resources employed in current computer operating systems. Examples of such operating systems are the "Macintosh™" operating system offered by Apple™ Computers, Inc. and the "Windows™" operating system marketed by Microsoft™ Corporation. In such graphical display operating systems, different resources may be open or operative simultaneously. The graphical display screens of each resource may be arranged and sized by the user in a selected configuration that enhances the ability to use those resources and to move between them when necessary.

If many resources are open simultaneously, the physical space on the display screen available for simultaneously displaying all open resources is limited by the physical size of the display screen and the practical limit of a usable, viewable amount of space necessary for the user to use the file or program. Consequently, when more than a few resources are open simultaneously, the open screens are typically covered and obscured from view by other graphical displays. Obscuring the screens makes it difficult for the user to move between them and to manage the resources, primarily because of the difficulty associated with mentally visualizing the screens, many of which may be obscured.

Furthermore, upon opening and arranging the resources in a particular configuration for a specific use, the configuration is lost when the resources are closed at the conclusion of use. Thus, the user must take the time and make the effort to reconstruct the particular configuration the next time that particular configuration of resources is to be used for a specific purpose or task, if the user can remember and duplicate the configuration. This reconfiguration can consume considerable time and becomes a deterrent or inconvenience.

Although some graphical display operating systems offer the capability to open files in a selected configuration upon start up operation of the computer, this capability is limited to a single start-up configuration, and cannot be used to establish to multiple different operating configurations of files and programs for particular tasks. For example, a word processing program, a desktop publishing program and a particular text file may be required for writing or editing documents. An Internet access program, a data transfer program, a modem and data files may be required to use an Internet telecommunications capability to transfer and receive files with a remote computer resource. In each case, the user must individually open and completely configure each of the files and their status to accomplish each task, unless the initial start-up configuration is selected. Generally speaking, the usual start-up configuration is inadequate to address all of the needs and requirements of a modern computer user.

In the early stages of the computer evolution, proposals were made to present files in a three-dimensional display, for the purpose of convenient management and recognition. These proposals, however, occurred at the time when the need for better resource management was not apparent or necessary for the vast majority of computer users. Furthermore, all but the most extensive and complex mainframe computers lacked the computational-intensive processing capability necessary to generate a realistic three-dimensional display which was necessary to the execution of those proposals. A typical early three-dimensional file display proposal was configured as a series of rotating disks. Each disk of a higher hierarchical level would be rotated to select the relevant sub-directories of files. Once a sub-directory was selected, the next lower hierarchical disk presented the files available in that sub-directory. The user manipulated the disks until the lowest hierarchical disk presented the programs and files selected for use. The mostly conceptual nature of this proposal is exemplified by the fact that no practical method of accounting for the exponential expanding size of each lower hierarchical disk was described, at least insofar as is known.

The benefits of a three-dimensional file management system can be significant, particularly considered in relation to the expanding need for increased resource management and program accessibility. A three-dimensional display of resources provides greater perspective for the user to identify and select files, and enhances the ability of the user to recognize and identify files and to understand the relationship of those files to one another. Three-dimensional presentations are familiar and comfortable, primarily because of their similarity to the three-dimensional world in which users live.

Three-dimensional resource management may also create significant spatial orientation difficulties for some users. In three-dimensional presentation on a two dimensional display screen, some users are prone to lose there bearings or reference perspective. Losing ones bearings under such circumstances is tantamount to losing control of the system, and usually requires the user to retreat to an initial fixed position in the three dimensions and start over.

Because of the difficulty in the reference bearings in three dimensions, some computer three-dimensional graphical displays also provide a two-dimensional reference display to indicate characteristics or position within the three dimensions. These reference displays generally are usually limited in representing only certain segments of the three dimensions, thereby providing only limited assistance in maintaining the user's bearings when navigating through three dimensions. In addition, some computer games, which are marketed as three-dimensional displays, are actually two dimensional presentations with graphical enhancements to create the impression of three dimensions. These types of displays usually do not require a reference display because of the selective and limited nature of the displays. Three-dimensional computer aided design programs offer the capability to present a single design in three dimensions and from different points of view or perspectives, but the point of view is relative only to that single design and the user does not have the capability to move within an unconfined universe of three dimensions.

It is with respect to these and other considerations that the improvements of the present invention have resulted.

SUMMARY OF THE INVENTION

The three-dimensional graphical resource management process and system of the present invention offers significant improvements to achieve a true three-dimensional presentation of resources, and movement within the three-dimensional environment, thereby enhancing the recognition of the resources and their capability for use.

In accordance with this general aspect, the graphical resource management process is executed by programmed instructions of a general purpose computer in response to input information. The general purpose computer includes a memory in which the programmed instructions are recorded, an input device to supply input information for interaction with the programmed instructions, and a display device for displaying information created by the programmed instructions and the input information. The functions achieved by the programmed instructions involve creating a display of a three-dimensional universe in a main window on the display device and creating a display of a three-dimensional environment as a subset of the three-dimensional universe. A plurality of resources available for use through the computer are represented by a plurality of corresponding resource icons, and the icons are established at predetermined different positions within the three-dimensional environment. A user's point of view is established within the three-dimensional environment, and a field of view of the environment is displayed in the main window from the user's point of view. The resource icons are displayed within the field of view. Thereafter the user's point of view is moved in three dimensions within the three-dimensional environment in response to input information supplied at the input device, and a resource icon visible within the field of view is selected to activate the corresponding resource. The true three-dimensional presentation of the environment and the resource icons located within the environment, coupled with an ability to move throughout the three-dimensional environment greatly enhances the utility of the graphical resource management systems.

One of the improved aspects available from the present invention relates to a view box reference window which presents, in a two dimensional presentation as a subset of the main window, an effective display for orienting the user in true three dimensions, thereby greatly assisting the user in navigating through three dimensions. Consequently, with the improved navigational and bearing-maintaining capability applied the three dimensions, the number of display opportunities is increased beyond those which can be presented in the typical two dimensions of a graphical display operating system. Furthermore, the navigational and resource-presentational capabilities provide the user with greater and easier recognition and avoid significant mental and perceptional restrictions that some users experience in navigating through three dimensions.

In accordance with this aspect of the invention, the programmed instructions of the present invention create a view box window on the display which presents a two-dimensional display of two dimensions of the three-dimensional universe, and a reference point within the view box window is created to represent the position of the user's point of view within the three-dimensional universe. Preferably, the view box window and the main window illustrating the three-dimensional environment are displayed simultaneously. Further still, the view box window preferably displays first and second views of the three-dimensional universe, the first view being a two-dimensional display of first and second dimensions of the three-dimensional universe, and the second view being a two dimensional display of second and third dimensions of the three-dimensional universe. Moving the user's point of view within the three-dimensional environment involves moving the user's point of view within the first and second dimensions of the three-dimensional universe when the first view is displayed in the view box window, and moving the user's point of view within the third dimension of the three-dimensional universe when the second view is displayed in the view box window. As a result of these and other improvements, the user may leap between two separate points within the three-dimensional universe and more easily retains his or her perspective and bearings when moving within a defined three-dimensional environment.

Another improved aspect of the present invention relates to improved resource presentation and organization. Within each three-dimensional environment in the universe, resource icons are organized in patterns and configurations to enhance the ability of the user to recognize those resources. Furthermore, parent-child relationships are correlated by interrelating the icons within these patterns to graphically represent the subject matter content within those resources. Hierarchical relationships can also be illustrated by these patterns. All of these features contribute an enhanced capability to quickly utilize those resources.

In accordance with this aspect, the resource presentation and management features of the present invention involve positioning the resource icons within the selected three-dimensional environment in a predetermined three-dimensional configuration, preferably by using a predetermined three-dimensional space filling algorithm. Preferably the three-dimensional configuration of resource icons signifies hierarchical relationships between the resources by the relative positioning of the corresponding resource icons. Examples of three-dimensional configurations include a pyramid, a spiral, a cube, a cone and a sphere. The icons are preferably logically associated by including icon information associated with each resource icon which defines the relative location of the resource icon in the three-dimensional environment and establishes hierarchical relationships between the icons. Preferably, an object is part of the icon information associated with each resource icon, and parent-child relationships are established between the objects and hence the resources.

Another improved aspect of the present invention relates to saving states associated with resources. As a result of the state saving capability, the user may obtain preselected collections of active resources to accomplish certain specific tasks. Multiple collections may exist, so that the user may easily return to a pre-existing state of active resources without the need to continually re-configure his or her resources to accomplish the recurring task. Furthermore, the characteristics of the saved states allow viewing from a saved point of view perspective which offers significant recognition enhancements in three dimensions. Saving the characteristics of the state from a point of view is particularly valuable in a three-dimensional presentation because of large number of potential perspectives. This point of view also greatly enhances the recognitional capabilities afforded to the user, because the file patterns and configurations may be quickly identified. The ability to save the point of view as part of an programming object may have great utility in a variety of three-dimensional displays not involving resource presentations, such as those employed in computer aided design programs. Further still, the capability to save states and to transfer the characteristics of the saved states from one computer system to another, provides multiple users with similar recognition opportunities and capabilities.

In accordance with this aspect, a state saving capability of the present invention involves associating a predetermined plurality of resources to accomplish a predetermined task, and recording state information in the memory describing the resource icons corresponding to the predetermined plurality of associated resources. Thereafter the recorded state information is recalled from the memory, and the resources icons are displayed for activation according to the state information. Part of the state information may include three-dimensional point of view information for displaying from a predetermined perspective the resource icons corresponding to the associated resources. As a result, multiple operative states are available for rapid and convenient use.

A more complete appreciation of these and other significant aspects of the present invention and its scope may be obtained from the accompanying drawings, which are briefly summarized below, from the following glossary of terms used to describe this invention, from the following detailed description of a presently preferred embodiment of the invention, and from the appended claims. The headings employed in the detailed description are for convenience of organization and presentation, and the information discussed under each heading is not to be considered apart of the complete description contained herein.

BRIEF DESCRIPTION OF THE DRAWINGS

FIGS. 2, 3 and 4 are illustrations of a view box window which also appears in the screen display shown in FIG. 1.

FIG. 5 is an illustration similar to the screen display shown in FIG. 1, in which a main view window illustrates a portion of an environment also shown in FIG. 1 in an enlargement and from a different camera angle from that shown in FIG. 1.

FIG. 6 is an illustration similar to the screen display shown in FIG. 5 with the scale of the view box window changed.

FIG. 12 is an illustration of a three-dimensional pyramidal configuration of resource icons.

FIG. 13 is a side view of the three-dimensional pyramidal configuration shown in FIG. 12.

FIG. 14 is an illustration of the three-dimensional pyramidal configuration shown in FIG. 12 to which has been added another hierarchy of resource icons.

FIG. 15 is an illustration of a part of the three-dimensional pyramidal configuration shown in FIG. 14.

GLOSSARY AND ACRONYMS

As a convenience in describing the invention herein, the following glossary of terms is provided. Because of the introductory and summary nature of this glossary, these terms must also be interpreted more precisely by the context of the Detailed Description in which they are discussed.

"Environment" means a three-dimensional volume within the universe which can contain a virtual three-dimensional structure.

"File" means data, information, or executable code which is stored in a memory.

"Folder" means a directory or group of files.

"Point of view" means the perspective or view of a user within the universe.

"Portal" means a passageway for movement between different environments in the universe.

"Resources" means folders, files, audio information, video information, and any other applications which are stored or otherwise accessed by a user of a computer system.

"Resource icon" means a graphical shape representing information which is associated with a resource.

"Space" means an environment with resource icons displayed at locations within the environment.

"State" means the environment(s) within the universe, resource icons within the environment(s), and the user's point of view within the universe.

"Universe" means a three-dimensional volume.

In addition to the foregoing terms, the following acronyms are used in this description.

"FTP" means file transfer protocol which is typically employed to transfer files from one computer system to another computer system over a wide area network.

"HTML" means hyper-text markup language.

"LAN" means local area network.

"URL" means universal resource locator.

"WAN" means wide area network, including the Internet.

DETAILED DESCRIPTION OF PREFERRED EMBODIMENT INTRODUCTION

Figure 1:
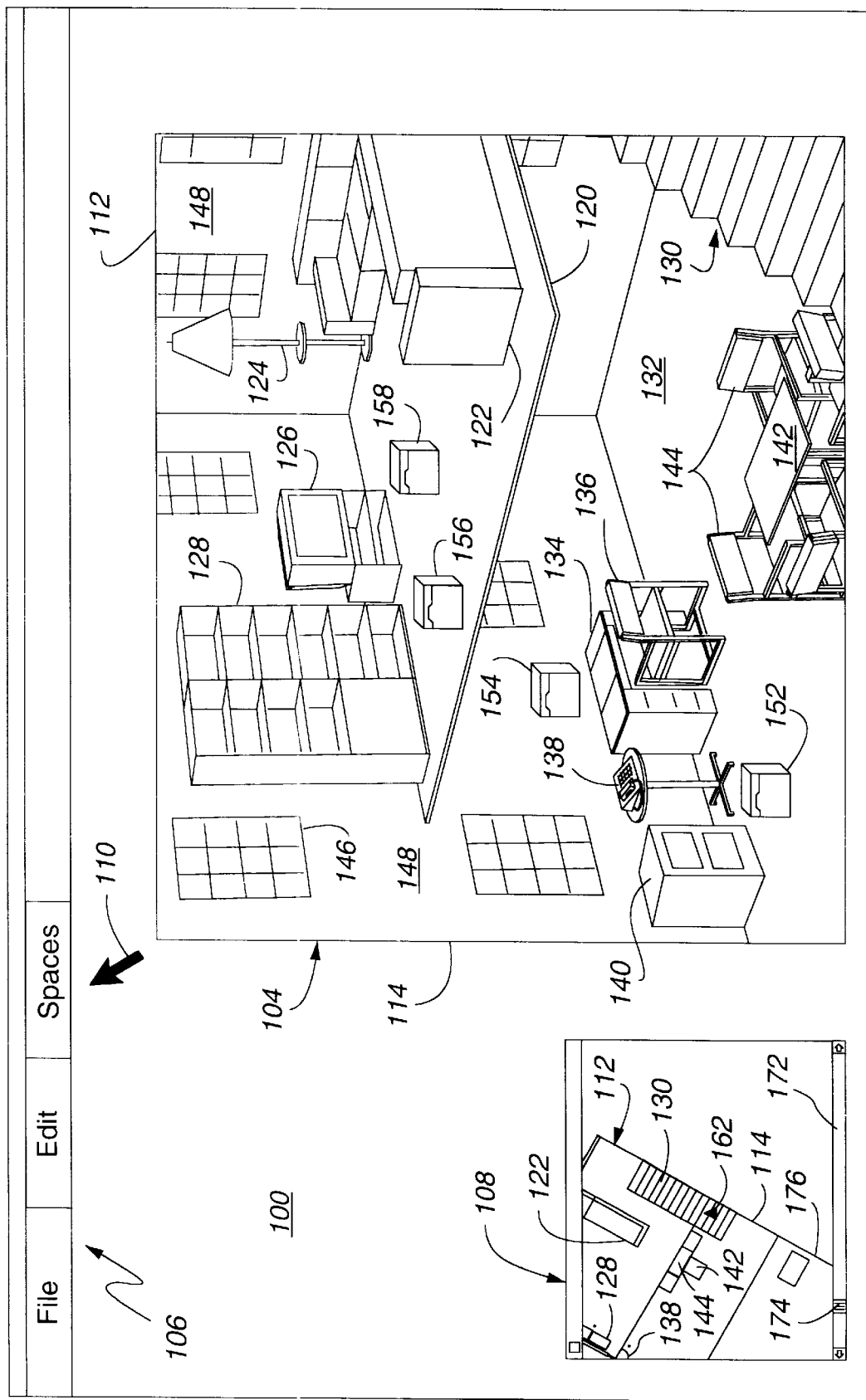
FIG. 1 is an illustration of an exemplary screen display developed according to the present invention, which appears on a display device of a computer system upon which the present invention is executed.

A preferred embodiment of the three-dimensional graphical resource management process and system of the present invention is best understood by reference to FIGS. 1–7. A screen display 100 of a computer monitor or display device 102 (FIG. 7) is depicted in FIG. 1. The screen display 100 may include various additional program windows (not shown), but at a minimum the screen display 100 includes a main view window 104 and a drop-down menu bar 106. The screen also preferably includes a view box window 108 displayed separately from the main view window 104. A cursor 110 is preferably used for accessing the drop-down menu bar 106 and for navigating within the view box window 108 and accessing resource icons within the main view window 104, as described below.

The main view window 104 depicts a three-dimensional universe within which one or more specific spaces are defined for the purpose of organizing, displaying and making accessible to a user, a number of computer resources. The resources are represented and accessed by resource icons shown in the three-dimensional universe (see, for example, resource icons 152, 154, 156 and 158 in FIG. 1). These resources may include computer files, directories, applications or gateways to remote computer systems (such as local area networks or Internet sites), for example, indeed, if the user is connected to a remote site, the resources may include both the files, directories and applications stored locally as well as those stored at the remote site.

To provide a framework for the three-dimensional display of computer resources within the main view window 104, one or more spaces are defined within the universe. A space is defined by an environment within which the resource icons are placed. An environment may be any three-dimensional structural model, but is preferably a structural model which provides sufficient visual cues to allow a user to readily divide and organize the three-dimensional space within the environment for efficient management of computer files or other resources.

A sample model environment 112, consisting of a two-room furnished house, is shown in FIGS. 1–6. As shown in FIG. 1, the main view window 104 depicts a three-dimensional view of a first room 114 of the house 112. The three-dimensional image within the main view window 104 displays a field of view taken from the perspective of a user navigating the three-dimensional spaces defined by the resource management process and system. For the purposes of the following description, the perspective or point of view of the user navigating the three-dimensional main view window 104 is simulated by a camera referred to as the "main view camera." The main view camera may be positioned at any desired coordinate within the three-dimensional spaces defined by the resource management process and system and may be rotated about three local axes to provide a desired perspective or point of view of the three-dimensional space. Thus, the user's movement through the three-dimensional space is equated to movement of the main view camera through the space.

The main view camera for FIG. 1 is positioned in an upper corner of the first room 114 of the house 112 which forms the sample environment shown in FIGS. 1–6. The first room 114 includes a loft 120 upon which is arranged a variety of furnishings including a couch 122, a lamp 124, a television 126 and two book shelves 128. A stairway 130 connects the loft 120 to a lower level 132. The lower level also contains furnishings consisting of a desk 134 with a chair 136, a telephone 138, a filing cabinet 140 and a table 142 with a set of four chairs 144. A number of windows 146 are located along exterior walls 148 of both the loft 120 and the lower level 132. Additionally, resource icons 152, 154, 156 and 158 are displayed within the environment adjacent the telephone 138, the desk 134, the book shelves 128 and the television 126, respectively. These resource icons could respectively represent URL addresses, a computer desktop, reference works and multimedia applications or files, for example.

Navigation through the three-dimensional space depicted in the main view window 104 is preferably accomplished in one of two ways. The first mode of navigating the three-dimensional space comprises progressively moving or "flying" through the space. This type of three-dimensional navigation requires redrawing the screen at a predetermined frame rate to simulate the "flying" motion and is well-known to those skilled in the art of three-dimensional graphics engines. The three-dimensional movement is preferably performed by movement along a vector defined by the point of view of the main view camera (i.e., forward or rearward movement) in combination with rotation of the main view camera itself about one or more local axes. The main view window 104 (i.e., the field of view of the user) is then redrawn in response to each unit of movement or rotation that is input by the user. A number of known input devices, such as a keyboard, mouse, joystick, etc., may be used to move the main view camera through the main view window 104. For example, the up and down arrows on a keyboard may be used move the main view camera forward and rearward, respectively, along the point of view of the main view camera. Additionally, the left and right arrow keys may be used to rotate or "yaw" the main view camera about a local vertical axis. Further key combinations may be used to rotate the main view camera about the remaining two local axes (i.e., to "pitch" and "roll" the main view camera). Alternatively, a joystick could be used to "fly" the main view camera through the three-dimensional space.

During three-dimensional navigation within the main view window 104 a user may become disoriented, particularly if he or she ventures outside the confines of the environment represented by the house 112, or if the scale of the presentation in the main view window becomes overwhelming. In the preferred embodiment, users have the ability to move or "fly" through the exterior walls 148 of the house 112. Such an ability allows a user to explore the entire universe of spaces which has been created by the resource management process and system. For instance, a second house 160 (FIG. 6) may exist near the first house 112 so that movement between the two houses may be as simple as "flying" through a wall of the first house 112 and then through an exterior wall of the second house 160. However, should a user leave the confines of the first house 112 in a direction which does not provide the user with a view of another defined environment such as the second house 160, or if the universe of space defined by the resource management system includes only a single environment, then the user may become disoriented upon exiting the house 112. Such disorientation may occur, for example, when the main view camera is positioned outside the house 112 and is directed away from the house 112 so that the user's field of view displayed within the main view window 104 shows only a blank screen. Thus, attempting to turn around and "fly" back to the house 112 may be difficult if there are no visual cues displayed within the main view window 104. However, the view box window 108 (FIGS. 1–6) provides an important navigational aid to the user by providing a constantly updated two-dimensional map or reference showing the user's position in relation to the environment, such as the house 112, as well as the remainder of the universe.

The view box window 108 preferably shows a top plan view of the universe of space created by the resource management process and system where the user's location (i.e., the location of the main view camera) is always located in the center of the view box window 108 and is depicted by a pointer 162 preferably shaped like a triangle. As the main view camera moves through the three-dimensional space displayed in the main view window 104, a two-dimensional top view of the environment moves by or rotates around the pointer 162 so that the pointer continuously indicates the user's position, at least with respect to the universal X-Z coordinates of the main view camera. Due to the inherent limitations of a two-dimensional display, and due to the choice of a top view display within the view box window 108, the elevation or universal "Y" coordinate of the main view camera is not typically shown within the view box window 108. However, it is this very constraint of the two-dimensional display which provides necessary cues about the user's three-dimensional position without overloading the mental capabilities of the user by providing too much information.

In this respect, the view box window 108 acts somewhat like an artificial horizon instrument within an airplane. The artificial horizon provides a visual indication of an airplane's position or rotation about two of the three axes of rotation (specifically the pitch and the roll axes) and provides crucial bearings for a pilot when he or she has lost sight of the three-dimensional world outside the airplane, such as when the airplane is flying within a cloud. Similarly, the view box window 108 acts like a navigational aid to provide needed information to the user as the user moves the main view camera through the main view window 104.

The top plan view preferably displayed within the view box window 108 is based on a universal coordinate system for the universe of spaces created by the resource management system. The two-dimensional view box is created by positioning a "view box camera," separate from the main view camera, at a position slightly above the main view camera and then directing the view box camera downward in the direction of the universal Y-axis to show both the top plan view and the location of the main view camera relative to the top plan view. For example, as shown in FIG. 1, the main view camera is positioned over the stairway 130 at an elevation which places it above the loft 120 (as determined by the field of view shown in the main view window 104). Therefore, the view box camera is positioned above the main view camera and is directed back downward to display the stairway 130, the loft 120, the furnishings within the loft, and a portion of the furnishings on the lower level 132, to the extent those furnishings do not underlie the loft 120. However, as shown in FIG. 5, the position of the main view camera has been moved so that it is now positioned below the level of the loft 120. Therefore, the top view displayed within the view box window 108, which is based on positioning the view box camera slightly above the main view camera and then directing the view box camera downward, does not depict the loft 120 or its furnishings. Rather, the view box window 108 preferably shows only a top view of the lower level 132 along with the furnishings and the stairway 130. Thus, the provision of the two-dimensional view box window 108, in conjunction with the three-dimensional main view window 104, allows the user to quickly and simply maintain or recover his or her bearings should the user either become disoriented within the displayed environment or move outside the established environment (e.g., the house 112) where there may be insufficient visual cues to properly navigate within the three-dimensional main view window 104.

In addition to "flying" through the three-dimensional space within the main view window 104, a second mode of navigating through the universe of space is to leap directly from a first location to a second location by using the two-dimensional map within the view box window 108. In many instances, a user may find it inconvenient to "fly" over great distance within an environment or to "fly" between two separate environments. To accommodate the desire of a user to leap between separate and possibly distant points within the three-dimensional universe of spaces, the two-dimensional view box window 108 may be used to quickly and easily input a new set of universal X, Y, and Z coordinates. Once the user has input this set of new coordinates within the view box window 108, the main view window 104 is quickly redrawn to provide a three-dimensional view of the space from the new desired location. The user may then alter his or her point of view within the three-dimensional display of the main view window 104 by manipulating the main view camera as described above. This second mode of navigation (i.e., leaping between separate points as opposed to flying from a first point to a second point) is described below with reference to the sequence of illustrations shown in FIGS. 1–5.

FIG. 1 illustrates a first screen display 100 where the main view camera is positioned in an upper corner of the first room 114 of the house 112. The X, Y and Z coordinates of the main view camera can be discerned by looking at the field of view displayed in the main view window 104 and by noting the X-Z coordinates of the main view camera as denoted by the pointer 162 in the view box window 108. FIG. 5 illustrates a second view of the screen display 100 following the movement of the main view camera from the first point illustrated in FIG. 1 to a new position below the level of the loft and facing the filing cabinet 140, the telephone 138 and the desk 134 which are situated on the lower level 132 of the house 112. FIGS. 2–4 illustrate a sequence of images and computer cursor movements within the view box window 108 to complete a leap from the first point illustrated in FIG. 1 to the second point illustrated in FIG. 5.

The "leap" form of navigation is initiated by using an input device 190 (FIG. 7) such as a mouse (not shown) to position the computer cursor 110 within the view box window 108 (FIG. 2) at a point corresponding to the X-Z coordinates of a new point in three-dimensional space where the user desires to leap. The difference between the X-Z coordinates of the original position of the main view camera and the desired new position of the main view camera is depicted graphically within the view box window 108 (FIG. 2) as the difference between the position of the triangular pointer 162 (denoting the original position of the main view camera) and the position of the cursor 110.

Once the user has positioned the cursor 110 at the desired point within the view box window 108 (in the case shown in FIG. 2 the cursor 110 is pointing to a position in front of the telephone 138), the user preferably clicks a button (or activates a switch) on the mouse to input the X-Z coordinates. If the user desires to also change the Y-coordinate of the main view camera position (i.e., if the user desires to raise or lower the main view camera), the user will hold the mouse button down for a predetermined and relatively short period of time. Upon the expiration of the predetermined time period, the two-dimensional view within the view box window 108 will shift from the top plan view (the X-Z coordinates shown in FIGS. 1 and 2) described above to a front elevational view (the X-Y coordinates shown in FIGS. 3 and 4). The front view of the environment, in this case the house 112, will be established by the universal coordinate system defined for the universe of space and will not vary due to the local position or point of view of the main view camera. Thus, the front view of the house 112 shown in FIGS. 3 and 4 will remain constant while the main view camera is positioned within the house 112.

Upon shifting from the top plan view to the front view, the computer cursor 110 is preferably positioned initially at an X-Y coordinate corresponding to the new X-Z position previously entered by the user in combination with the previous Y-coordinate corresponding to the original position of the main view camera within the three-dimensional space of the house 112. Additionally, the front view is preferably drawn within the view box window 108 so that the cursor 110 is initially vertically centered within the window 108 (i.e., the cursor is centered along the portion of the Y-axis which is visible within the view box window 108). Thus, the cursor position shown in FIG. 3 represents the new X-coordinate established by clicking the mouse button as shown in FIG. 2, and the previous Y-coordinate as can be approximated from the three-dimensional view within the main view window 104 shown in FIG. 1. Furthermore, the front view of the house 112 is preferably drawn in FIG. 3 so that the cursor 110 is centered vertically within the window to provide the user maximum flexibility to adjust the Y-coordinate either up or down. If the user desires to change the Y-coordinate of the main view camera position (i.e., the elevation of the main view camera within the house 112), the user drags the mouse either up or down and then releases the mouse button when the cursor 110 has reached the desired Y-coordinate. A graphical line 170 (FIG. 4) is preferably drawn within the view box window 108 during the mouse drag motion to depict the change in the Y-coordinate. The line 170 remains within the view box window 108 until the mouse button is released. Additionally, since the user has previously selected his or her desired X-Z coordinates, the user may not alter the X-coordinate during the mouse drag step illustrated in FIGS. 3 and 4. Thus, even if the user moves the cursor 110 along the X-axis (i.e., left or right) while dragging the cursor in the motion shown in FIGS. 3 and 4, the vertical line 170 is constrained to only extend along the universal Y-axis and thus must be represented as a vertical line in FIG. 4.

The combination of establishing the new X-Z coordinate of the main view camera by showing a top view of the environment (FIG. 2) and then shifting the view box camera to show a front view (FIGS. 3 and 4) whereby the user may drag the cursor 110 along the Y-axis to establish the new Y-coordinate of the main view camera position allows the user to quickly leap from one set on three-dimensional coordinates to a second set of coordinates via a relatively quick and simple mouse movement within the view box window 108. Once the mouse button is released at the end of the mouse drag motion (FIG. 4), the view box window 108 shifts back to a top plan view of the environment by repositioning the view box camera slightly above the new position of the main view camera. Thus, as shown in FIG. 5, while the main view window 104 shows a three-dimensional perspective of the house 112 from the point of view of the new main view camera position, the view box window 108 has also been redrawn to accurately note the new position of the main view camera in the X-Z plane. Furthermore, as described above, because the view box camera is now positioned below the level of the loft 120 and is directed downward at the main view camera, the top plan view illustrated in the view box window 108 shown in FIG. 5 preferably no longer depicts the layout of the loft 120 as was originally shown in FIG. 1 when the view box camera and the main view camera were positioned above the loft 120.

To enlarge the scale of the view box window 108, thereby displaying more of the environment to allow for navigational leaps over larger portions of the environment or between separate environments, a slider bar 172 (FIGS. 1–6) is positioned at the bottom of the view box window 108. Movement of a slider button 174 along the slider bar, by clicking the computer cursor 110 on the button 174 and dragging the button along the slider bar 172, alters the scale of the view box window 108. However, it is important to note that the position of the view box camera is not altered as the scale of the view box window is altered. Thus, the view box camera preferably maintains its position slightly above the main view camera, while the slider bar 172 may be used for zooming the view box camera in or out to show various fields of view. When the slider button 174 is positioned at the left side of the slider bar 172, the view box camera is preferably showing a top view of the environment in an approximate 1:1 ratio relative to the view displayed by the main view camera in the main view window 104. When the button 174 is moved to the opposite end of the slider bar 172, the view box camera is considered to be zoomed out to its maximum level so that it shows a top view of the entire three-dimensional universe of spaces defined by the resource management system. Such a large scaling factor may be desirable when the environment itself is very large so that the user may leap between different parts of the environment, or when a number of different environments exist within the universe of space defined by the resource management system and the user desires to easily leap between the different environments.

An example of altering the scaling factor applied to the view box window 108 is shown in FIGS. 5 and 6. The scaling factor applied to the view box window 108 shown in FIG. 5 is the same as the scaling factor shown in FIGS. 1–4 which illustrate the sequence of moves required for a navigational leap between two different positions within the house 112. Thus, the position of the slider button 174 remains constant throughout the views shown in FIGS. 1–5.

FIG. 6 illustrates the view from the view box camera following movement of the slider button 174 to the right along the slider bar 172. The scale within the view box window 108 increases to show the entire floor plan of the house 112, including the shape and details of a second room 176. Additionally, a second environment comprising the second house 160 is also revealed in the upper left corner of the view box window 108. By revealing this second environment, the user now has the option of moving from his or her position within the first house 112 (denoted by the position of the pointer 162) to a new position within the second house 160 via the leap maneuver described above. It should be noted that the view from the main view camera (i.e., the field of view displayed within the main view window 104) is not altered by zooming the view box camera in or out. Thus, the main view window 104 remains the same as shown in FIGS. 5 and 6.

A modified mode of navigation within the three-dimensional space combines the "flying" movement and the "leaping" movements described above. Three-dimensional portals (not shown) may be positioned within the environments such as the house 112. These portals will be displayed within the main view window 104 in a manner similar to any other environmental object and will preferably be labeled to denote its function as a portal. Should the user "fly" into the portal during his or her travels through the environment, the user will automatically leap to a different corresponding portal located elsewhere within the universe of spaces defined by the resource management system. For instance, the new portal may be located at a different location within the same environment, but is preferably located within a separate environment such as the second house 160 (FIG. 6). Thus, the use of portals allows for selective leaps between two fixed locations within three-dimensional space. However, the pre-defined portals do not allow the user to select either the starting point or the ending point of a navigational leap, and the use of portals within the main view window 104 does not require manipulations within the two-dimensional view box window 108 as described above with respect to FIGS. 1–5.

While both the main view window 104 and the view box window 108 are preferably displayed simultaneously on the screen display 100 as shown in FIGS. 1, 5 and 6, the view box window 108 may be closed to free up more room on the display screen for displaying programs. Alternatively, the view box window 108 may be displayed on top of the main view window 104 as opposed to displaying the view box window 108 beside the main view window 104 as shown in FIGS. 1, 5 and 6. Additionally, the size of the main view window 104 and the view box window 108 may preferably be altered by dragging a corner of the windows in a conventional manner. The ability to size and selectively position the windows 104 and 108, as well as to eliminate entirely the view box window 108, provides the user with maximum flexibility to work with the three-dimensional graphics resource management system of the present invention. A more thorough explanation of navigating the three-dimensional spaces illustrated in FIGS. 1–6 is explained below in conjunction with the diagrams shown in FIGS. 7–11.

To accomplish the general functions described above in conjunction with FIGS. 1–6, as well as to accomplish other functions described more specifically below, the program code and instructions of the present invention are executed on a conventional computer system such as that shown at 180 in FIG. 7.

The computer system 180 includes a processor 182 and a memory which takes the form of one or more random access memories (RAM) 184 and one or more hard disk drive memories 186. The display device 102 presents the three-dimensional information to the user in the screen display 100 (FIG. 1) according to the operation achieved by the program code of the present invention. An input device 190 such as a keyboard, a mouse or a joystick allows the user to enter information and to communicate with the computer system 180 and the program code of the present invention. One or more interface devices 192, such as a modem, a LAN interface card or a WAN interface card are available to communicate data and instructions between the computer system 180 and one or more remote computer resources connected through the interface devices 192. These computer system components, and other conventional computer components not shown, are interconnected by a conventional bus 194, over which data and instructions are communicated between the components to obtain proper operation.

In all respects from a hardware standpoint, the computer system 180 is conventional. Preferably the present invention is executed on an Apple™ Macintosh™ computer using the highest possible clock speed microprocessor.

The improvements from the present invention reside in the program instructions and code which are resident in the RAM 184 and in the hard drives 186 and which are employed by the processor 182 to achieve the functionality of the present invention. The improvements of the present invention are described below in greater detail in the following three subject matter categories.

Three-dimensional Space Navigation

The processor 182 of the computer system 180 interacts with input information supplied by the input devices 190 and with the program instructions and code of the present invention to perform the functions summarized above and explained more explicitly in connection with the following diagrams, each function being identified by a separate reference number.

Figure 8:
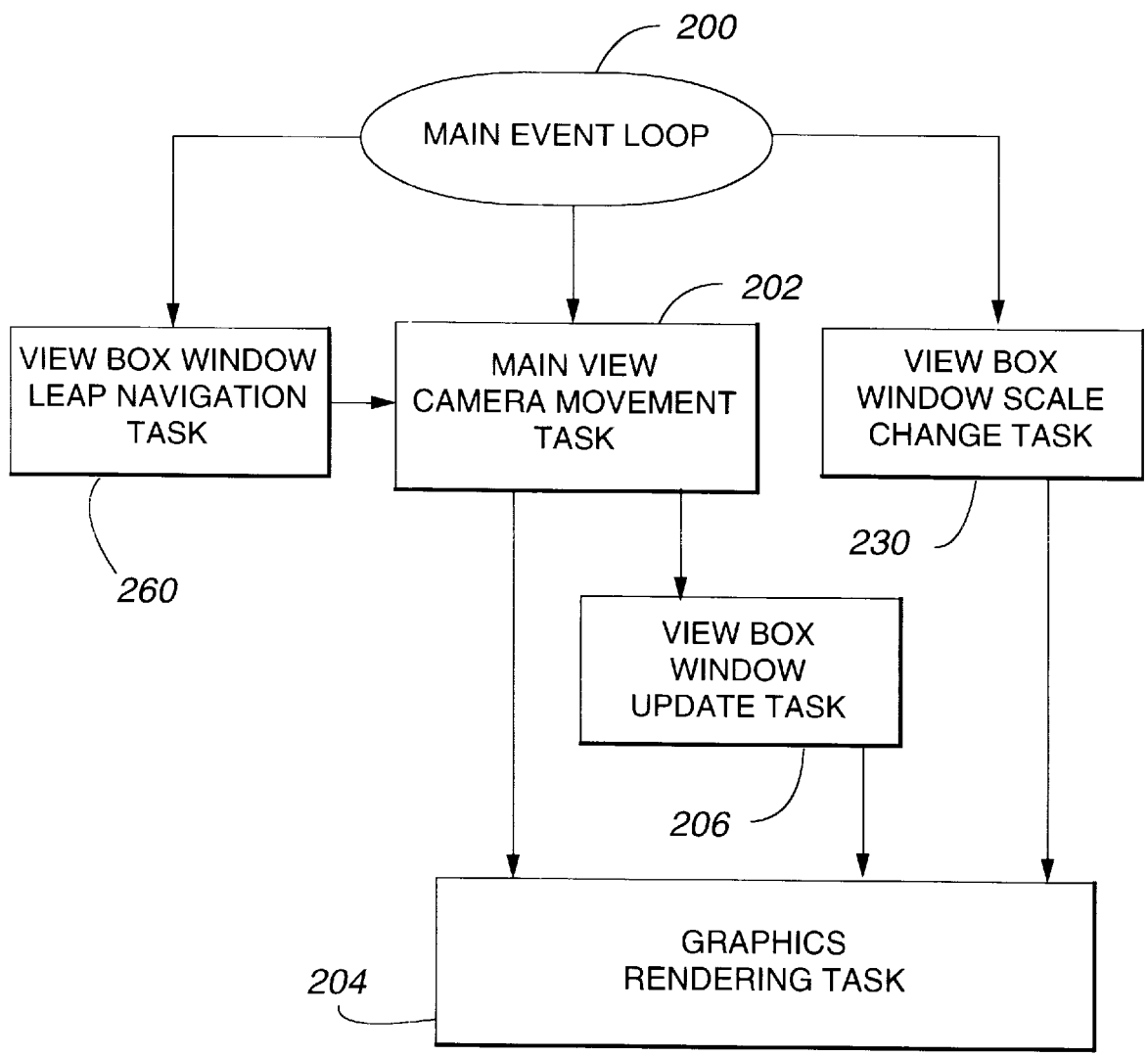
FIG. 8 is a flow diagram illustrating a main event loop of the most generalized tasks and functions performed according to the present invention.

FIG. 8 represents a main event loop 200 within the processor 182, and illustrates the subroutines called by the main event loop 200 to effect navigation through three-dimensional space using the main view window 104 and the view box window 108. In response to an event comprising input information for movement through the main view window 104, the main event loop 200 calls a main view camera movement task at 202. This camera movement task 202 calculates the proper amount and direction of movement of the main view camera from the user's input information and sends the calculations defining the state of the main view camera (i.e., the field of view displayed within the main view window 104) to a graphics rendering task 204. In response to a continuous stream of user inputs (such as when a user is "flying" through the three-dimensional space), the main event loop 200 sends a stream of movement commands to the main view camera movement task 202 which, in turn sends a stream of information updating the state of the main view camera to the graphics rendering task 204. The graphics rendering task 204 then continuously updates the field of view to be displayed within the main view window 104 and redraws the main view window 104 at a predetermined frame rate to preferably simulate a fluid motion through the three-dimensional space.

The main view camera movement task 202 calculates the movement of the main view camera based on a local coordinate system which is distinct from the universal coordinate system used to define fixed environments such as the house 112. The local coordinate system is essentially rotated from the universal coordinate system so that the local coordinate system is aligned with the point of view of the main view camera. The use of the local coordinate system by the main view camera movement task 202 allows the graphics rendering task 204 to redraw the main view window 104 (to illustrate the updated position of the main view camera within the three-dimensional space) without having to apply a transform to convert the user input information to the universal coordinate system. In other words, in response to user input information to move forward in the direction of the point of view of the main view camera, the main view camera movement task 202 calculates the proper amount of forward movement and commands the graphics rendering task 204 to update the field of view displayed within the main view window 104 without having to first transform the forward movement along the local axes of the main view camera to a separate universal axes. This saves computational cycles and thus valuable time (possibly allowing the graphics rendering task 204 to operate at a faster frame rate) when a user is "flying" through the three-dimensional space displayed in the main view window 104.

The main view camera movement task 202 is described more thoroughly in the attached Code Appendix containing a source code listing of the subroutines required to process the user input commands from the main event loop and supply the output information which relates the main view camera's state (i.e., its position and its point of view) to the graphics rendering task 204. Similarly, the graphics rendering task 204 may comprise any conventional three-dimensional graphics rendering program. The preferred embodiment of the present invention utilizes the Apple™ QuickDraw 3-D™ program to perform this task.

In addition to calling the graphics rendering task 204 to redraw the main view window 104 in response to movement in the main view window 104, the main view camera movement task 202 also calls a subroutine at 206 to update the view box window 108 (e.g., FIG. 1). The view box window update task 206 is shown separately in FIG. 9. A wait state 210 waits for a main view window movement command from the main view camera movement task 202 (FIG. 8). Upon receiving a main view movement command at 210, a determination is made at 212 as to whether the view box window 108 is visible on the screen display 100 (e.g., FIG. 1). If the determination is made at 212 that the view box window 108 is visible, the program flow proceeds to calculate the new position of the view box camera based on the new position of the main view camera calculated at 202 (FIG. 8).

As a first step (at 214) in calculating the new position of the view box camera, the view box camera is positioned at the same position as the main view camera. In effect, all the parameters which define the position and the point of view of the view box camera are set to equal those same parameters of main view camera following the preceding movement of the main view camera at 202 (FIG. 8). Next, the view box camera is moved upward at 216 by increasing the value of its universal Y-coordinate. The new Y-coordinate may optionally be set to a value greater than the maximum Y-coordinate of the environmental model to ensure that environmental details positioned above the main view camera position are shown in the view box window 108. However, the preferred embodiment of the invention preferably increases the Y-coordinate of the view box camera only marginally above that of the main view camera so that the top down view of the view box camera shows the position of the main view camera but is not blocked by intervening environmental structures positioned above the main view camera.

Figure 9:
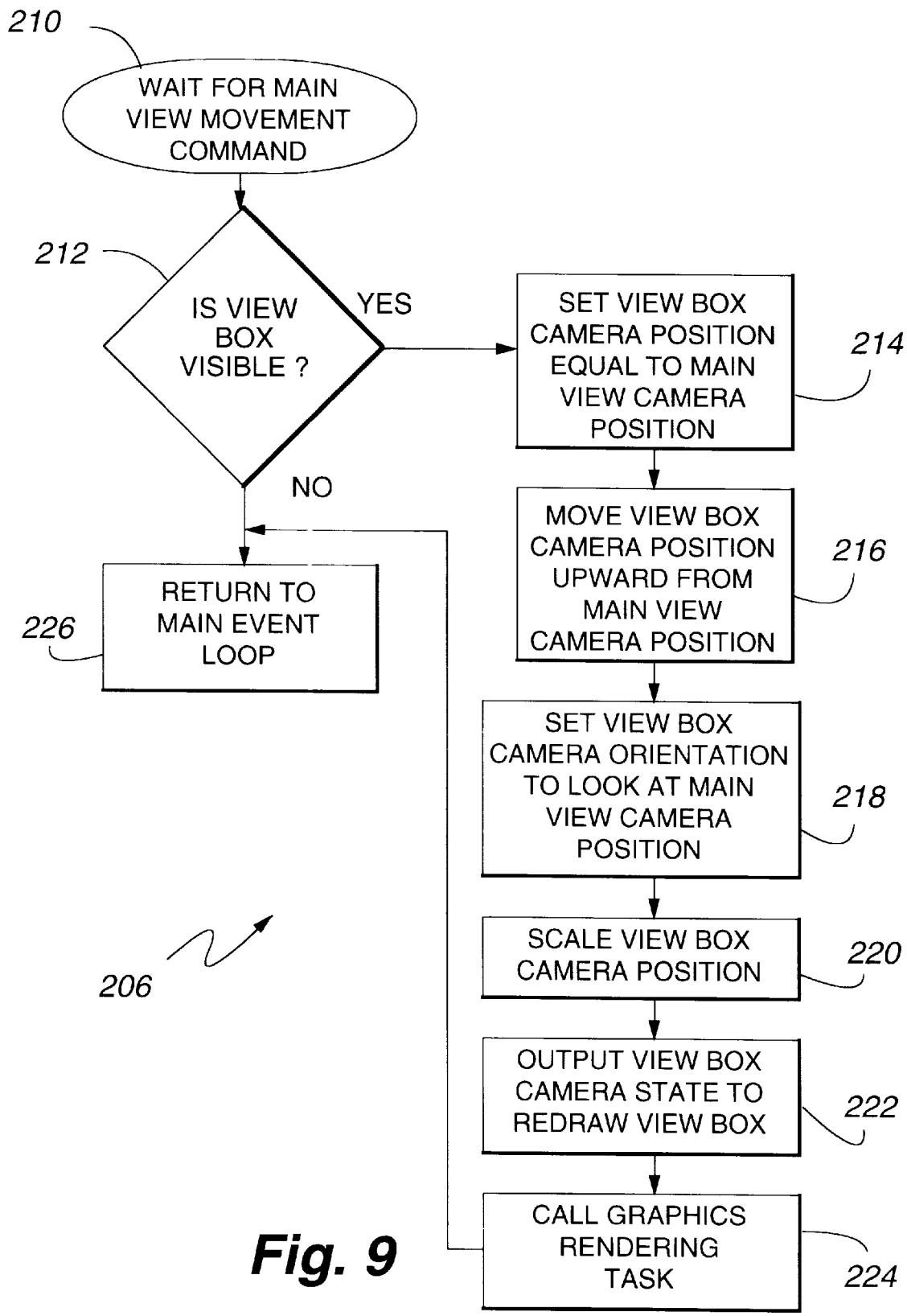
FIG. 9 is a flow diagram illustrating the functions associated with the view box window update task shown in FIG. 8.
Figure 10:
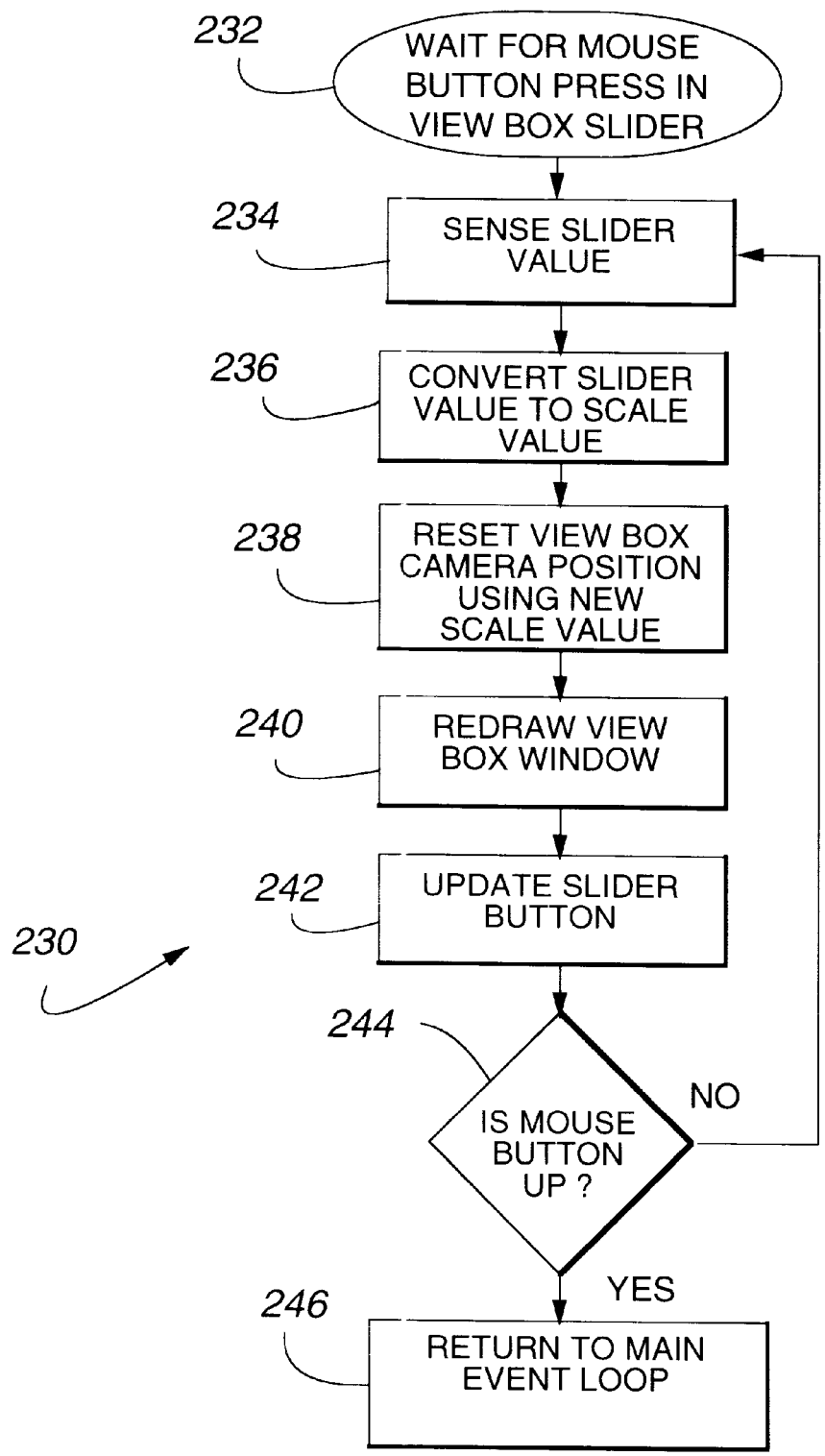
FIG. 10 is a flow diagram illustrating the functions associated with the view box window scale change task shown in FIG. 8.
Figure 11:
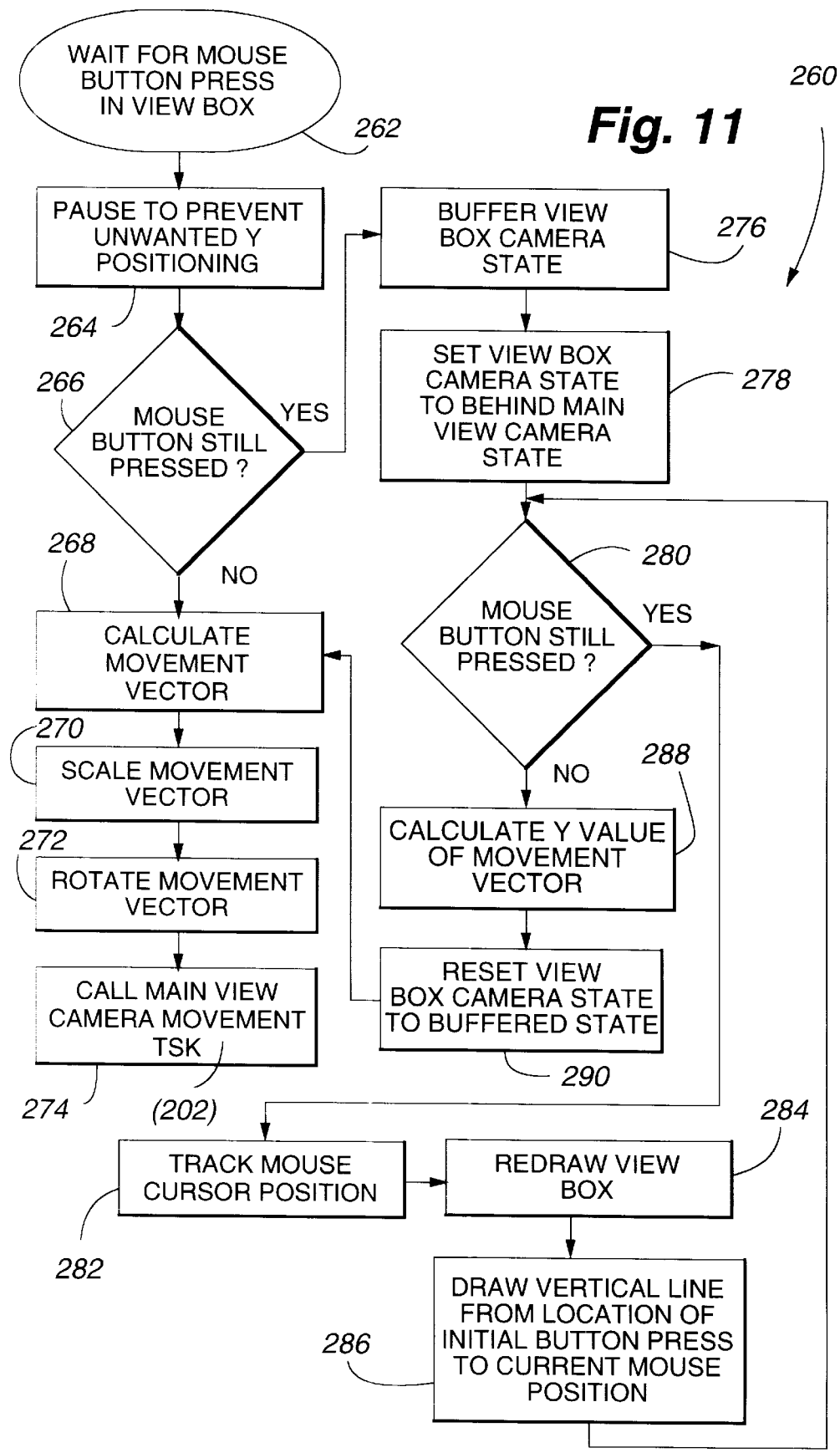
FIG. 11 is a flow diagram illustrating the functions associated with the view box window leap navigation task shown in FIG. 8.

This preferred Y-coordinate positioning is shown in the different views afforded by FIGS. 1 and 5. Shown in FIG. 1, the main view camera is positioned above the loft 120. Thus, the view box camera is also positioned above the loft so that the view box window 108 shows the details of the loft. Shown in FIG. 5, the main view camera has been positioned below the level of the loft. Thus, as noted above, there are two possibilities for moving the view box camera above the position of the main view camera at step 216 (FIG. 9). The first possibility (not shown) is to move the view box camera above the highest point of the house 112 so that the view box window 108 continues to show the details of the loft 120. However, the preferred possibility of executing the step 216 is to move the view box camera only slightly above the main view camera so that only the position of the main view camera and the details below the main view camera (i.e., below the loft 120) are shown in the view box window 108 (FIG. 5).

Next, the orientation of the view box camera is set at 218 (FIG. 9) to look downward at the position of the main view camera as has been described above. A scaling transform is then applied to the view box camera at 220 to provide a desired zoom factor as described earlier with reference to FIGS. 5 and 6. The scaling transform scales the view box camera position relative to the main view camera position based on a scaling value derived from the position of the slider button 174 within the slider bar 172 in the view box window 108. The scaling transform also accounts for the ratio of the size of the view box window 108 to the size of the main view window 104. A more detailed description of altering the scale of the view box window 108 is included below with reference to FIG. 10.

Once the parameters of the view box camera have been calculated in steps 214, 216, 218 and 220 (FIG. 9) so that the state of the view box camera has been determined, this state is output at step 222 and a call is made at step 224 to the graphics rendering task 204 (FIG. 8) to redraw the view box window 108. If the determination is made at 212 (FIG. 9) that the view box window 108 is not visible (e.g., if the user has closed the view box window or has hidden it behind another open window), then a call is made immediately at 226 to return to the main event loop 200 (FIG. 8) without calculating the new state of the view box camera.

The main event loop 200 shown in FIG. 8 may also call two other navigation subroutines in direct response to user input information. One of these navigation subroutines comprises the above-described method (FIGS. 5 and 6) of scaling the view box window 108. Thus, when a user desires to change the scale of the view box window 108, the main event loop 200 calls a subroutine at 230 (FIG. 8) to change the scale of the view box window 108. This view box window scale change task 230 is shown separately in FIG. 10.

A wait state 232 (FIG. 10) waits for a user to click the mouse button while the cursor 110 is positioned over the slider button 174 within the slider bar 172 of the view box window 108. As the user drags the slider button 174 across the slider bar 172, a loop is initiated as shown within FIG. 10 which continuously updates the scale of the view box window 108 and redraws the view box window 108 until the mouse button is released. The first step in this loop is to sense the value of the slider button 174 (FIG. 6) at 234. The slider button is set to continuously return its current value while it is being dragged through the slider bar 172 by the user. The slider value preferably ranges from 0 at the left end of the slider bar 172 to a maximum value of 100, for example, at the right end of the slider bar. The slider value (sensed at step 234) is then converted to a view box camera scale value at step 236. This conversion is necessary to convert the slider bar range of 0–100 to a scale factor which preferably varies from a ratio of 1:1 at the left end of the slider bar 172 to a value of 100% (i.e., the view box window 108 is scaled to show the entire universe of three-dimensional spaces defined by the resource management system) at the right end of the slider bar. The new scale value calculated at 236 is then used to reset the position of the view box camera at 238. Resetting the view box camera position entails completing the steps 214, 216, 218 and 220 (FIG. 9) to move the view box camera above the main view camera, point the view box camera down at the main view camera and then apply the scaling transform (using the new scale value calculated at 236) to ensure that the position of the main view camera (i.e., the location of the pointer 162) remains centered within the view box window 108. The view box window 108 is then redrawn at step 240 (FIG. 10) with the new scale factor applied. Additionally, the position of the slider button 174 within the slider bar 172 is updated at 242 as the user continues to drag the slider button through the slider bar. A determination is then made at 244 as to whether the mouse button has been released (i.e., whether the slider button has been "dropped" at a final location). If the mouse button is still down so that the user has not yet finished dragging the button through the slider bar 172, the loop repeats starting with step 234 which again senses the slider button value and then proceeds to redraw the view box window 108 with the updated scale value. If the determination is made at 244 that the mouse button has been released, then a call is made at 246 to return to the main event loop 200 (FIG. 8).

A second navigation subroutine which may be called directly by the main event loop 200 (FIG. 8) comprises the above-described method of leaping between two points by using the view box window 108 (e.g., FIG. 1). Thus, when the main event loop 200 receives input from a user for a navigational leap, it calls a subroutine at 260 (FIG. 8) to perform the navigational leap. This view box window leap navigation task 260 is shown separately in FIG. 11.

A wait state 262 (FIG. 11) waits for a user to click the mouse button while the cursor 110 is positioned within the view box window 108. A short pause is then initiated at 264 to allow the user to release the mouse button without initiating a change in the vertical positioning of the main view camera. Following the pause at 264, a determination is made at 266 whether the mouse button is still pressed. If the button is not still pressed, it is presumed that the user is only making a change in the universal X-Z coordinates of the main view camera and an appropriate movement vector is calculated at step 268. The movement vector calculated at step 268 is based on the universal coordinate system of the environment (i.e., the house 112) depicted in the view box window 108. This movement vector represents the change in the universal X-Z coordinates from the initial position of the main view camera (e.g., the position of the pointer 162 shown in FIG. 2) and the new position of the main view camera (e.g., the position of the cursor 110 shown in FIG. 2). This universal movement vector calculated at 268 is then scaled at 270 to account for the scaling factor that the user has applied to the view box window 108. Scaling of the movement vector created from within the view box window 108 is required before the movement vector may be applied to the main view window 104. The scaling process at step 270 essentially comprises applying the inverse of the scale transform utilized at step 220 (FIG. 9).

Once the movement vector is scaled at 270, it is then rotated at 272 to convert the universal movement vector to the local coordinate system of the main view camera. Rotating the movement vector in this manner allows the previously described main view camera movement task 202 (FIG. 8) to be used to move the main view camera position (i.e., alter the field of view) within the main view window 104. Therefore, upon rotating the scaled movement vector at 272 to align the vector with the main view camera, a call is made at 274 (FIG. 11) to the main view camera movement task 202 (FIG. 8) to update the main view window 104. Thus, the same main view camera movement task 202 is used both for direct movement within the main view window 104 and for "leap" navigation using the view box window 108.

If the determination is made at 266 (FIG. 11) that the mouse button is still pressed, it is presumed that the user wishes to change the Y-coordinate or the elevation of the main view camera within the three-dimensional space. A separate subroutine for altering the Y-coordinate is then inserted before the step 268 of calculating the universal movement vector. First, the view box camera state is placed in a buffer at 276 so that it may be later retrieved. Next the view box camera is moved from its position above the main view camera to a position behind the main view camera at 278. Moving the view box camera in this manner provides a front view of the environment (with the cursor 110 vertically centered within the view box window 108, as shown in FIG. 3) as opposed to the usual top view depicted in the view box window 108 (as shown in FIG. 2). A determination is then made at 280 as to whether the mouse button is still pressed. As long as the mouse button is still pressed, the position of the mouse cursor 110 is tracked at step 282. The view box window 108 is then redrawn at step 284 and a vertical line is preferably drawn within the view box window 108 at step 286. The vertical line is drawn from the location of the initial mouse press (i.e., the original Y-coordinate of the main view camera) to the current location of the mouse cursor 110.

There exist two possibilities for positioning the vertical line within the view box window 108 while establishing the new Y-coordinate of the main view camera. The first possibility (not shown) is to draw the vertical line from the original X-Z coordinate of the main view camera prior to setting the new X-Z coordinate by clicking the mouse within the view box window 108. If this possibility were followed in FIGS. 3 and 4, the position of the cursor 110 and the vertical line 170 would have been shifted to the right as the original position of the main view camera was over the stairway 130 (as shown in FIG. 2). However, the preferred possibility for positioning the vertical line while establishing the new Y-coordinate of the main view camera is to start the vertical line at the newly chosen X-Z coordinate. Thus, FIG. 4 illustrates the vertical line 170 and the cursor 110 on the left side of the view box window 108 as this corresponds to the new X-Z coordinate selected in FIG. 2. Regardless of which method is used to display the vertical line 170 within the view box window 108, the length of the vertical line represents the change in the universal Y-coordinate of the main view camera position. Once the mouse button is released, corresponding to a negative determination at step 280 (FIG. 11), the Y-value of the universal movement vector is calculated at 288 and the original (top plan view) state of the view box window 108 is retrieved at 290 from the buffer where it was placed in step 276. Next, steps 268, 270 and 272 are followed to calculate the entire universal movement vector (all three coordinates) and then scale and rotate the universal movement vector so that it may be directly applied to the local coordinate system of the main view camera. Finally, step 274 calls the main view camera movement task 202 (FIG. 8) to redraw the main view window 104 at the conclusion of the "leap." Of course, the view box window 108 is then updated by the view box window task 206 (FIG. 8), as previously described.

Figure 7:
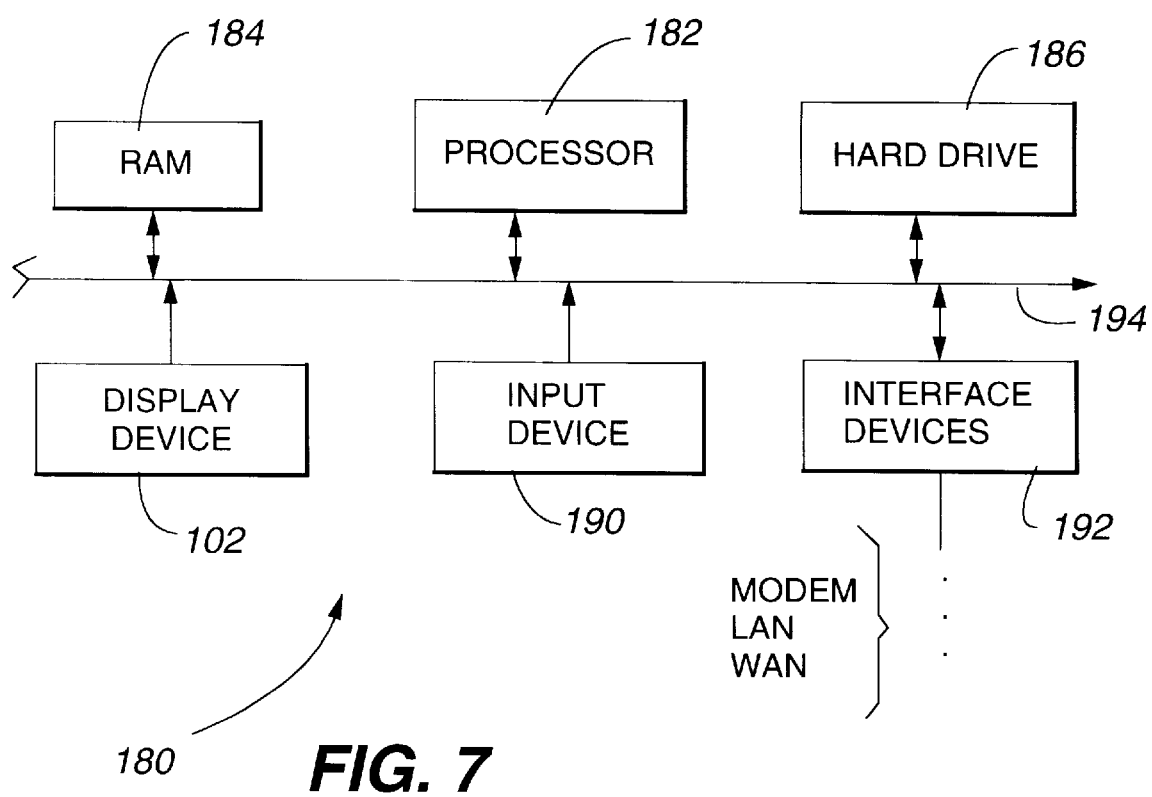
FIG. 7 is a block diagram of a computer system which is controlled by the instructional code of the present invention.

In this manner, the user navigates in three dimensions through the environment to access resources such as directories, files, and multimedia applications which are stored or otherwise accessed on the local computer system 180 (FIG. 7) and any remote systems which are connected to the local system 180 through a modem, LAN, WAN or any of the other interface devices 192 (FIG. 7). The resources are displayed to a user as graphical icons which are positioned within the environment. Each resource icon includes information which defines the location of the associated resource in the local or remote system. The user accesses a desired resource by placing the cursor 110 (FIG. 1) on the resource icon which is associated with the desired resource and preferably double-clicking the mouse button (not shown).

Resource Organization

To convey information about resources and to facilitate the utilization of resources, resource icons are organized into three-dimensional configurations. For example, resources can be organized into a three-dimensional pyramidal configuration 300 as shown in FIGS. 12–15. A main resource 302 is located at the apex of the pyramidal structure 300 and is aligned with an X-Y axes plane. The main resource 302 is associated with multiple sub-resources such as the eight sub-resources 304 which include folders and files, with the files being represented by the octahedron shaped icons. The sub-resources 304 are arranged along one or more X-Y axes planes (shown as one X-Y axes plane in FIG. 13) which are parallel to the X-Y axes plane of the main resource icon 302 and spatially disposed therefrom along the Z-axis.

A particular one of the sub-resources 304, noted with reference numeral 306, is further associated with multiple sub-resources such as the 36 sub-resources 308 shown in FIG. 14. In response to double-clicking the cursor 110 (FIG. 1) on the resource 306, the sub-resources 308 are organized and displayed as a pyramidal structure with the main resource 306 positioned at an apex position in the structure. In this manner, the hierarchical relationship between resources can be represented by nested three-dimensional pyramidal structures. Resources which are higher in a hierarchy are organized relative to a main resource which is closer to the X-Y-Z origin while resources which are lower in the hierarchy are organized relative to a main resource which is disposed more distant along the Z-axis from the X-Y-Z origin.

Within a three-dimensional configuration, resources are organized by selected characteristics, such as by their creation date, alphabetically by their name, or by their type (e.g., folder, text file, or executable file). For example, the sub-resources 304 (FIG. 12) can be organized so that the sub-resource 310 represents the latest resource date while the sequentially older sub-resources 304 are organized counterclockwise within the same X-Y axes plane.

Movement of a resource along any of the X-Y-Z axes causes an equivalent movement of all displayed sub-resources which are associated with the moved resource. For example, the user can move the resource 306 (FIG. 14) and its associated sub-resources 308 by placing the cursor 110 (FIG. 1) on the sub-resource 306 and dragging the sub-resource 306 to another position within the environment, as shown in FIG. 15. Consequently, the hierarchical three-dimensional structural relationship between a resource and its sub-resources is preserved when the resource is moved.

The three-dimensional configuration of resource icons may change in the number or location of displayed resource icons to reflect changes in any of the resources. For example, upon start-up of the resource management system or opening of a main resource icon, the three-dimensional configuration changes to reflect the deletion of a sub-resource, the addition of a sub-resource, a change in location of a sub-resource, or a change in the type of a sub-resource. This changing of the three-dimensional configuration over time represents a fourth-dimension through which users can understand the present availability, location, and other information associated with all resources which are accessed on the local computer system 180 (FIG. 7) and any connected remote systems.

Figure 16:
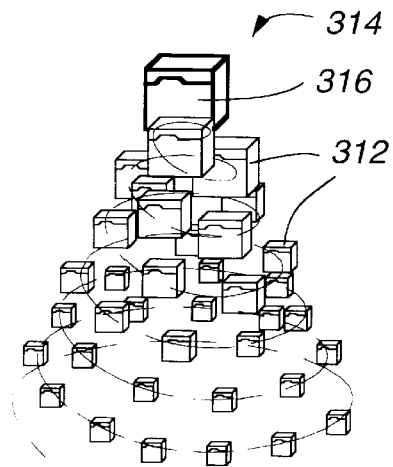
FIG. 16 is an illustration of a three-dimensional spiral configuration of resource icons.
Figure 17:
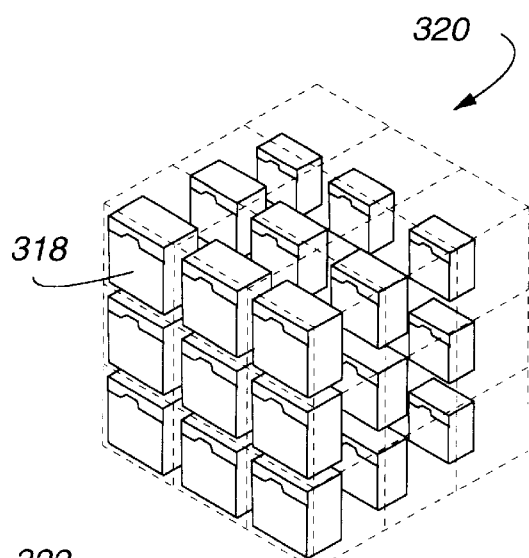
FIG. 17 is an illustration of a three-dimensional cubical configuration of resource icons.
Figure 18:
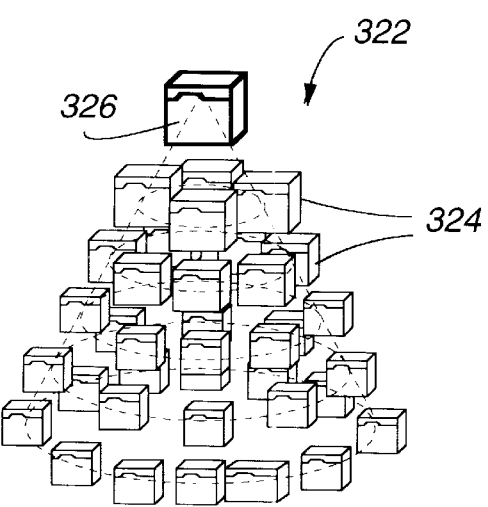
FIG. 18 is an illustration of a three-dimensional conical configuration of resource icons.
Figure 19:
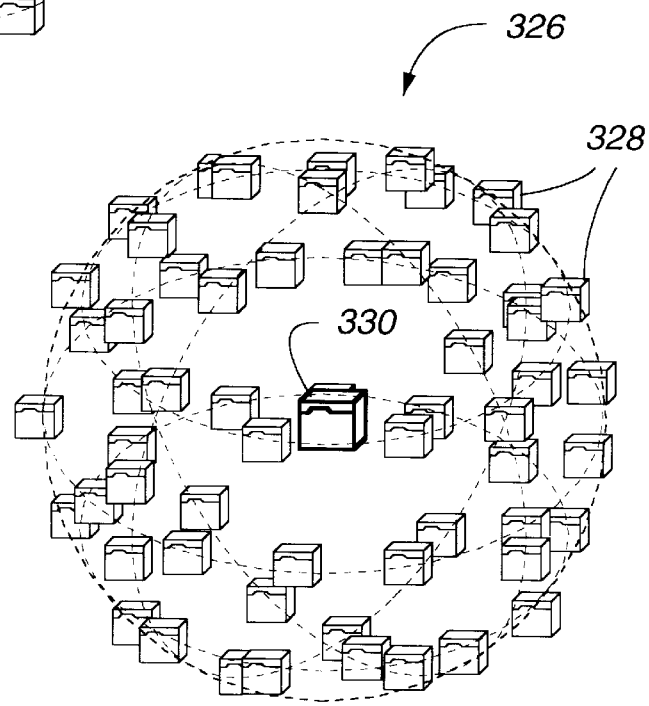
FIG. 19 is an illustration of a three-dimensional spherical configuration of resource icons.

Other examples of three-dimensional configurations in which resources can be organized include spiral, cubical, conical, and spherical. FIG. 16 shows resources 312 which are organized into a spiral three-dimensional configuration 314. A main resource 316 which contains the resources 312 is shown at an apex position in the spiral configuration 314. FIG. 17 shows resources 318 which are organized into a cubical three-dimensional configuration 320. FIG. 18 shows resources 324 which are organized into a conical three-dimensional configuration 322. A main resource 326 which contains the resources 324 is located at an apex position in the conical configuration 322. FIG. 19 shows resources 328 which are organized into a spherical three-dimensional configuration 326. A main resource 330 which contains the resources 328 is located at the center of the spherical configuration 326 with the resources 328 distributed evenly at a predetermined radial distance from the center of the configuration 330. The order in which sub-resources are organized within any of the three-dimensional configurations, 314, 320, 322 or 326, is determined by their selected characteristics (e.g., date, name, size or type).

Figure 20:
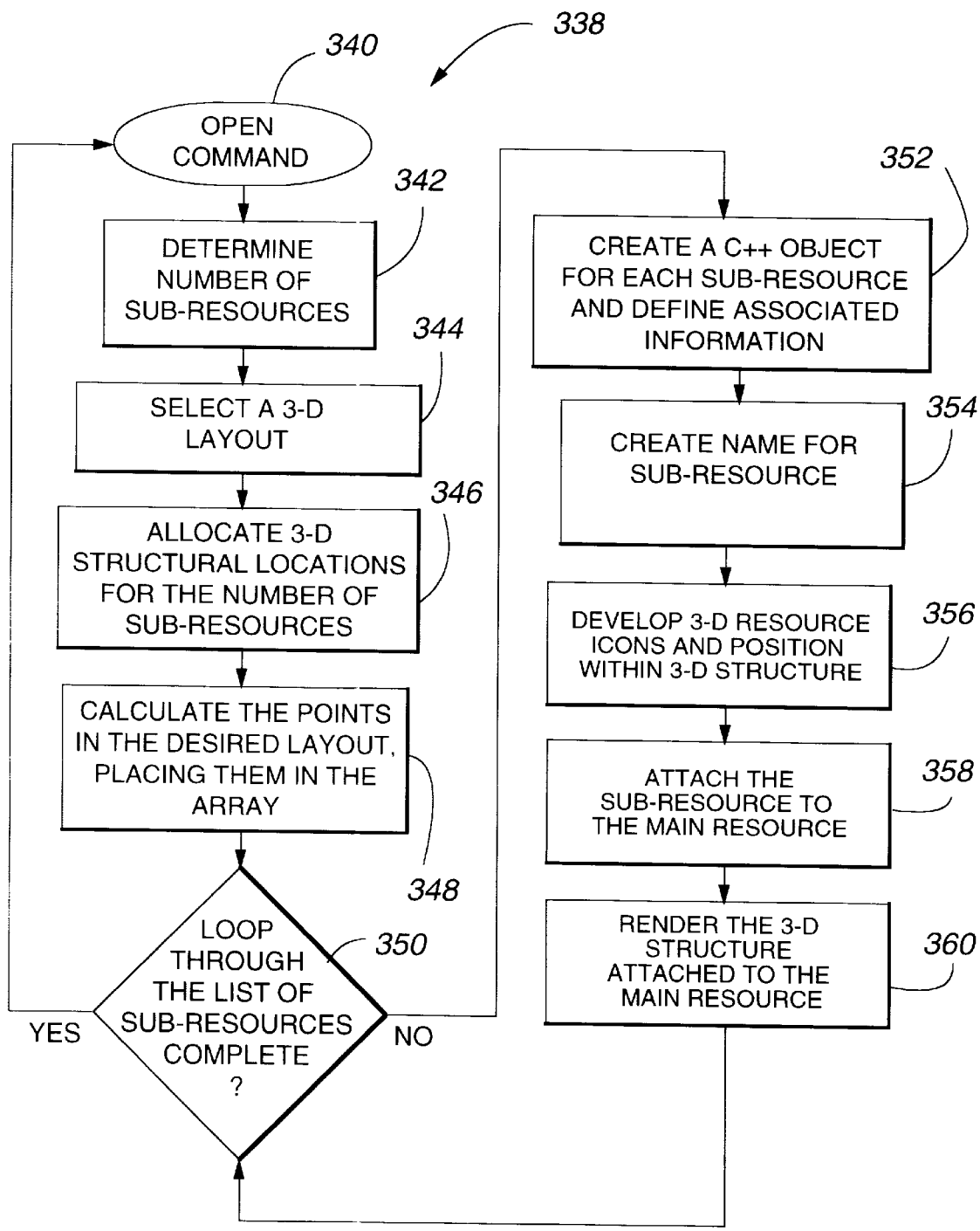
FIG. 20 a flowchart of operations involved in saving a state.

The user preferably creates a three-dimensional configuration of resource icons by first selecting an "ADD DESKTOP" command, for local resources, or "ADD URL" command for remote resources, within the pull-down menu bar 106 (FIG. 1). The user then clicks the cursor 110 (FIG. 1) at the virtual location within the environment where the main resource icon is to be placed, as shown for example by resource icons 152, 154, 156, and 158 shown in FIG. 1. The resource management process and system performs the three-dimensional space filling algorithm or routine 338, shown in FIG. 20, to display, as a three-dimensional configuration, any sub-resources which are associated with the main resource icon. In response to the user double clicking the cursor 110 (FIG. 1) on a main resource icon (step 340), the number of sub-resources which are associated with the main resource is determined (step 342). For example, the routine 338 will perform a DOS or UNIX directory command on the local or remote system where the main resource is located and count the number of sub-resources which are within the sub-directory of the main resource.

A three-dimensional configurational layout (e.g., pyramidal, spiral, cubical, conical, or spherical) is selected (step 344) for displaying the sub-resources. The selected three-dimensional configurational layout can be predefined by the user or the user can be prompted to select a configurational layout from within a predetermined list of three-dimensional configurational layouts. Next, space is allocated within the selected configurational layout which is sufficient to display the number of sub-resources (step 346). For example, when 7 sub-resources are to be displayed in a cubical three-dimensional structure, a 3×3 space (i.e., sufficient space for 9 sub-resources) will be allocated since this is the smallest space which can display the 7 sub-resources. Next, the virtual positions of the center of the graphical resource icons which will represent the sub-resources are determined (step 348). To facilitate the user's viewing of the three-dimensional structure, the virtual positions are equidistant from each other and the distance between adjacent virtual positions is at least as great as the width of the largest resource icon which will be displayed, for example as shown in FIG. 15.

For each of the sub-resources, the routine 338 performs the operations shown between steps 350–360 to display graphical icons which represent each of the sub-resources in the selected three-dimensional configurational layout. First, information which defines the location of the sub-resource on the local or remote system and the sub-resource type is associated with the sub-resource (step 352). Next, step 354 determines the name of the sub-resource from the directory listing of the hard disk where the sub-resource is stored and associates the name with the sub-resource. According to an object oriented approach, the main resource is defined as an object while each sub-resource and its associated information is defined as a sub-object. This object oriented approach can simplify the organization and manipulation of a large number of resources.

A graphical icon which will be displayed in the three-dimensional configurational layout to represent the sub-resource is assigned to the sub-resource at step 356. The shape of the graphical icon is determined by the sub-resource type. For example, a folder shaped icon is assigned to folders while an octahedron shaped icon is assigned to file type resources, as shown in FIG. 12. The position at which the sub-resource icon will be displayed in the three-dimensional structure is determined relative to the universal coordinate system (i.e., the coordinate system of the house 112) and relative to the main resource icon. Determining the position of each sub-resource icon relative to the universal coordinate system facilitates the movement of the sub-resource icon independent of the main resource icon.

The information which defines the sub-resource is placed in a list which is associated with the main resource so that actions which are performed on the main resource can be automatically performed on the sub-resources (step 358). For example, when the user moves the main resource 306 (FIG. 15), all sub-resources 308 (FIG. 15) are moved in the same manner as the main resource 306. Finally, the sub-resource is displayed in the selected three-dimensional configurational layout at step 360.

Once all of the sub-resources have been displayed (so that a positive determination is achieved at 350), the routine 338 returns to step 340 to wait for the user to command the display of sub-resources which are associated with another resource or sub-resource.

The user navigates through the environment in the previously described manner to view the three-dimensional resource configurations which have been positioned about the environment and to locate desired resources within the three-dimensional configurations. A desired resource is preferably accessed or executed by navigating to a position and orientation within the environment to where the desired resource icon is visible within the field of view of the main view window 104 and double clicking the cursor 110 on the desired resource icon.

Organizing the resources into three-dimensional configurations, which are placed at virtual locations within the environment and enabling the user to navigate through the environment facilitates the user's ability to determine the availability and location of resources in the local system and any remote systems. The three-dimensional configurational organization of the resources also enhances the users understanding of the associative relationships between the resources, such as the hierarchical location of files within folders.

The user can configure states which are optimized for performing different tasks, such as generating reports or presentations and performing research or entertainment. The user configures a state by selecting an environment, organizing the resources which are used in performing the task into one or more three-dimensional configurations, positioning the three-dimensional configuration(s) within the environment, and navigating about the environment to establish a point of view perspective which facilitates performing the task.

State Saving

Once a state is configured for a task, the user can save the state so that the saved state can be later recalled when the user desires to perform the associated task. A state is saved by writing information which defines the instant state to the hard disk of the local computer system. The user can establish a plurality of saved states, each of which has been optimized for a different task.

The information which defines an instant state is shown in Tables 1–3 and discussed below. An object oriented approach can be used in which a state is associated with a main object and the information which defines the state is associated with sub-objects of the main object. According to the object oriented approach, an operation such as storing or recalling the main object is also automatically performed on the sub-objects associated with the main object. Consequently, the object oriented approach simplifies the storing and recalling of states.

Table 1 shows the information which defines a state independently of any resources or portals in the state.

TABLE 1

1. Name of State.
2. File location of environment.
3. Scale of screen.
4. Camera position.
5. Camera Orientation.
6. Value indicating whether sound is on or off.
7. Value indicating whether network or remote access is desired.
8. Mapping between keys and operations for movement and rotation.

A state is saved as a file on the hard disk with a name which has been assigned by the user. To save a plurality of states, the user assigns a unique name to each of the states. The user can then recall any of the plurality of states by name. The environment is defined by a path to the file which contains the three-dimensional physical models of the environment. The user's point of view perspective within the environment is defined by the scale of the screen display, which is the user's field of view within the environment, and the position and orientation of the main view camera within the environment. The values for the scale of the screen and the position and orientation of the main view camera are calculated according the 3DMF industry standard which has been developed by Apple™ for interfacing to Apple™ QuickDraw 3D™. The state further includes values which define the user's preferences for whether sound is allowed, whether any network drivers are to be activated to enable access to any connected networks, and the mapping between the input device signals, such as in response to keyboard key depressions or joystick movements, and commands for navigating through the environment or operation of resources.

The information which is associated with each resource icon is shown in Table 2.

TABLE 2

1. Textual identifier for the resource.
2. Resource Type.
3. Resource location.
4. User's ID (remote network resource only).
5. User's password (remote network resource only).
6. Access Permission (i.e., User only, Group, or any user).
7. Value indicating whether the resource is selected.
8. Value indicating whether the resource is animated.
9. Rotational axes of the resource.
10. Value indicating whether the resource is open/closed.
11. Universal coordinate system location.
12. Local coordinate system location.
13. Value indicating whether the position is fixed.

The information associated with each resource icon includes data which identifies the name of the resource and the type of resource, such as a folder, a file, or a video and/or audio multimedia application. The information also includes an address which points to the location of the resource on the hard disk of the local or remote system. The address can be a DOS or UNIX standard path for a resource on the local system or a URL address for a resource on a FTP or a world wide WEB site. When the resource is located on a remote system, the information includes the user's ID and password, if any, which are used to access the remote system. The information further defines which users are permitted to access the resource, such as one predefined user, a predefined group of users, or any user. The resource management process and system prevents a user from accessing any resources which are outside the user's permissions.

The information also includes data which indicates whether the resource has been selected by the user, whether the resource icon is to be represented by moving or animated graphics, such as by a rotating octahedron (see 304 FIG. 12), when the file is selected, and whether a folder type resource is open with its sub-resources being illustrated as a three-dimensional structure. When the resource icon is animated, the information further defines any axes of rotation for the resource icon.

The information further defines the position of the resource icon within the environment (i.e., universal coordinate system), the position of the resource icon relative to other resource icons (i.e., local coordinate system) such as between a main resource and sub-resources, and whether the resource icon is fixed relative to the environment or may be moved by the user to other virtual positions within the environment.

The information which is associated with each portal is shown in Table 3. As shown, the information includes the position and orientation of the portal within the environment. The information further includes the location of the file which contains the models which define the environment which is invoked in response to the user navigating through the portal.

TABLE 3

1. Portal Position
2. Portal Orientation
3. Pointer to file containing another environment.

A state can be selectively saved in response to a command from the user, such as from a selection within the pull-down menu bar 106 (FIG. 1). A state can also be automatically saved at predetermined time intervals or upon events such as when the resource management process and system shuts down.

A remote computer system can include a saved state which defines a configuration of an environment, organization of resources within the environment, and a point of view perspective (i.e., orientation and position of the main view camera) which are optimized to assist users in locating and utilizing resources on the remote system. The saved state, along with the associated environment, can then be downloaded from the remote system to the local system when a user accesses the remote system for the first time or when the resources on the remote system have changed since the time when the user had previously accessed the remote system. The resource management system then recalls the downloaded state whenever the associated remote system is accessed. This feature enables an administrator of a remote system, such as of a FTP site or a world wide WEB site, to download an environment and associated preferred state to remote users so that resources on the remote system can be easily located and efficiently utilized. A remote system can download one of a plurality of saved states, with the downloaded state being selected based upon factors such as a user's access permission within the remote system or the user's familiarity and skill level at utilizing the remote system.

The benefits and advantages of the above-described three-dimensional graphical resource management process and system over conventional two-dimensional file managers (such as those used with the Windows™ and Macintosh™ operating systems) focus on substantially improved representation of resources and access of those resources through enhanced navigation techniques, as explained above.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed:

1. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

creating a display of a three-dimensional environment in a main window of the display device;

representing a plurality of resources available for use through the computer by a plurality of corresponding resource icons;

establishing predetermined different positions for each of the resource icons within the three-dimensional environment;

establishing a user's point of view within the three-dimensional environment;

displaying within the main window a field of view of the environment from the user's point of view;

displaying within the main window each of the resource icons which are visible within the field of view;

moving the user's point of view in three dimensions through incremental steps in response to input information correlated to a local set of axes defined by the user's point of view in the main window; and selecting a resource icon visible within the field of view through manipulation of the input device to activate the resource represented by the resource icon.

2. A graphical resource management process as defined in claim 1 further comprising the steps of:

displaying a portal at a first predetermined set of coordinates within the three-dimensional environment; and moving the user's point of view to a second predetermined set of coordinates within the three-dimensional environment by moving the user's point of view through incremental steps in the main window until the user's point of view coincides with the first predetermined set of coordinates.

3. A graphical resource management process as defined in claim 1 further comprising the steps of:

displaying a portal at a first predetermined set of coordinates within the three-dimensional environment; and moving the user's point of view to a second predetermined set of coordinates within a second three-dimensional environment by moving the user's point of view through incremental steps in the main window until the user's point of view coincides with the first predetermined set of coordinates.

4. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

creating a display of a three-dimensional environment in a main window of the display device;

representing a plurality of resources available for use through the computer by a plurality of corresponding resource icons;

establishing predetermined different positions for each of the resource icons within the three-dimensional environment;

establishing a user's point of view within the three-dimensional environment;

displaying within the main window a field of view of the environment from the user's point of view;

displaying within the main window each of the resource icons which are visible within the field of view;

moving the user's point of view in three dimensions within the three-dimensional environment in response to input information supplied at the input device;

selecting a resource icon visible within the field of view through manipulation of the input device to activate the resource represented by the resource icon;

creating a two-dimensional display of two dimensions of the three-dimensional environment in a view box window on the display device; and creating a reference point within the view box window to represent the position of the user's point of view within the three-dimensional environment.

5. A graphical resource management process as defined in claim 4 further comprising the steps of:

displaying the main window and the view box window simultaneously on the display device.

6. A graphical resource management process as defined in claim 4 further comprising the step of:

maintaining the reference point centered within the view box window.

7. A graphical resource management process as defined in claim 4, wherein the step of moving the user's point of view within the three-dimensional environment further comprises:

moving the user's point of view in response to input information correlated to a universal set of axes defined by the position of the reference point within the view box window.

8. A graphical resource management process as defined in claim 7 further comprising the steps of:

displaying the view box window in first and second views of the three-dimensional environment, the first view being a two-dimensional display of first and second dimensions of the three-dimensional environment, and the second view being a two dimensional display of second and third dimensions of the three-dimensional environment.

9. A graphical resource management process as defined in claim 8, wherein the step of moving the user's point of view within the three-dimensional environment further comprises the steps of:

moving the user's point of view within the first and second dimensions of the three-dimensional environment when the first view is displayed in the view box window; and moving the user's point of view within the third dimension of the three-dimensional environment when the second view is displayed in the view box window.

10. A graphical resource management process as defined in claim 9 further comprising the steps of:

updating the position of the user's point of view in the three-dimensional environment after the steps of moving the user's point of view within the first, second and third dimensions; and redrawing the view box window to accurately display the updated position of the reference point representing the position of the user's point of view within the three-dimensional environment.

11. A graphical resource management process as defined in claim 9 further comprising the step of:

translating the movement of the user's point of view within the first, second and third dimensions from the universal set of axes to the local set of axes defined by the user's point of view in the main window; and updating the display of the field of view of the three-dimensional environment and the resource icons in the main window as a result of the translated movement of the user's point of view along the local set of axes.

12. A graphical resource management process as defined in claim 8 wherein the input device includes a mouse having a switch having first and second operative positions and a movement translation transducer, the switch and the movement translation transducer supplying input information, and wherein the step of moving the user's point of view within the three-dimensional environment further comprises the steps of:

> positioning a cursor within the view box window when the first view is displayed in the view box window by moving the mouse to supply input information from the movement translation transducer;
>
> activating the switch to the first operative position to supply input information upon positioning the cursor at an initial point within the view box window corresponding to a new position of the user's point of view in the first and second dimensions of the three-dimensional environment;
>
> displaying the second view of the three-dimensional environment in the view box in response to activating the switch to the first operative position;
>
> positioning the cursor within the view box window after the second view is displayed in the view box window by moving the mouse to supply input information from the movement translation transducer while maintaining the switch activated in the first operative position;
>
> activating the switch to the second operative position to supply input information upon positioning the cursor at a terminal point corresponding to a new position of the user's point of view in the third dimension of the three-dimensional environment; and
>
> establishing the position of the user's point of view within the three-dimensional environment from the input information corresponding to the initial point of the cursor in the first view and the terminal point of the cursor in the second view.

13. A graphical resource management process as defined in claim 4 further comprising the steps of:

> directly moving the user's point of view within the three-dimensional environment displayed within the main window in response to input information supplied at the input device; and alternatively
>
> indirectly moving the user's point of view within the three-dimensional environment displayed within the main window in response to movement of the reference point in the two-dimensional view box window.

14. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

> creating a display of a three-dimensional environment in a main window of the display device, wherein the three-dimensional environment is a subset of a three-dimensional universe of space;
>
> representing a plurality of resources available for use through the computer by a plurality of corresponding resource icons;
>
> establishing predetermined different positions for each of the resource icons within the three-dimensional environment;
>
> establishing a user's point of view within the three-dimensional environment;
>
> displaying within the main window a field of view of the environment from the user's point of view;
>
> displaying within the main window each of the resource icons which are visible within the field of view;
>
> moving the user's point of view in three dimensions within the three-dimensional environment in response to input information supplied at the input device; and
>
> selecting a resource icon visible within the field of view through manipulation of the input device to activate the resource represented by the resource icon.

15. A graphical resource management process as defined in claim 14 further comprising the steps of:

> creating a display of a second three-dimensional environment within the three-dimensional universe of space; and
>
> moving the user's point of view in three dimensions through the three-dimensional universe of space to the second three-dimensional environment in response to input information supplied at the input device.

16. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

> creating a display of a three-dimensional environment in a main window of the display device;
>
> representing a plurality of resources available for use through the computer by a plurality of corresponding resource icons;
>
> establishing predetermined different positions for each of the resource icons within the three-dimensional environment;
>
> establishing a user's point of view within the three-dimensional environment;
>
> displaying within the main window a field of view of the environment from the user's point of view;
>
> displaying within the main window each of the resource icons which are visible within the field of view;
>
> moving the user's point of view in three dimensions within the three-dimensional environment in response to input information supplied at the input device;
>
> selecting a resource icon visible within the field of view through manipulation of the input device to activate the resource represented by the resource icon; and
>
> indicating the selected resource by moving the resource icon corresponding to the selected resource at the predetermined three-dimensional position of the icon.

17. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

> creating a display of a three-dimensional environment in a main window of the display device;

representing a plurality of resources available for use through the computer by a plurality of corresponding resource icons;

establishing predetermined different positions for each of the resource icons within the three-dimensional environment;

establishing a user's point of view within the three-dimensional environment;

displaying within the main window a field of view of the environment from the user's point of view;

displaying within the main window each of the resource icons which are visible within the field of view;

moving the user's point of view in three dimensions within the three-dimensional environment in response to input information supplied at the input device;

selecting a resource icon visible within the field of view through manipulation of the input device to activate the resource represented by the resource icon;

moving a cursor in three dimensions within the three-dimensional environment to a selected three-dimensional segment of the environment in response to input information supplied at the input device; and positioning the resource icons within the selected three-dimensional segment in a predetermined three-dimensional configuration.

18. A graphical resource management process as defined in claim 17 further comprising the step of:

signifying hierarchical relationships between the resources by the relative positioning of the corresponding resource icons within the predetermined three-dimensional configuration.

19. A graphical resource management process as defined in claim 17 further comprising the step of:

positioning the resource icons in the predetermined three-dimensional configuration according to a predetermined three-dimensional space filling algorithm.

20. A graphical resource management process as defined in claim 19 wherein the predetermined three-dimensional space filling algorithm positions the resource icons in one predetermined three-dimensional configuration selected from the group consisting of a pyramid, a spiral, a cube, a cone and a sphere.

21. A graphical resource management process as defined in claim 19 wherein the predetermined three-dimensional space filling algorithm positions the resource icons in the predetermined three-dimensional configuration according to an attribute of each of the resource icons, wherein the attribute is selected from the group consisting of date, name, and time.

22. A graphical resource management process as defined in claim 17 further comprising the steps of:

logically associating icon information with each resource icon;

including in the icon information associated with each resource icon, information for defining the relative location of the resource icon in the three-dimensional environment; and also including in the icon information associated with each icon, information to establish hierarchical relationships between the resource icons in the predetermined three-dimensional configuration.

23. A graphical resource management process as defined in claim 22 further comprising the steps of:

assigning an object to the icon information associated with each resource icon; and establishing parent-child relationships between the objects, the parent-child relationships of the objects representing the hierarchical relationships between the resource icons in the predetermined three-dimensional configuration.

24. A graphical resource management process as defined in claim 23 further comprising the step of:

assigning the information of each object which occupies a child position in the parent-child relationship to each associated object which occupies a parent position.

25. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

creating a display of a three-dimensional environment in a main window of the display device;

representing a plurality of resources available for use through the computer by a plurality of corresponding resource icons;

establishing predetermined different positions for each of the resource icons within the three-dimensional environment;

establishing a user's point of view within the three-dimensional environment;

displaying within the main window a field of view of the environment from the user's point of view;

displaying within the main window each of the resource icons which are visible within the field of view;

moving the user's point of view in three dimensions within the three-dimensional environment in response to input information supplied at the input device;

selecting a resource icon visible within the field of view through manipulation of the input device to activate the resource represented by the resource icon;

associating a predetermined plurality of resources to accomplish a predetermined task; and recording state information in the memory describing the resource icons corresponding to the predetermined plurality of associated resources.

26. A graphical resource management process as defined in claim 25 further comprising the steps of:

recalling from the memory, in response to input information supplied at the input device, the state information; and displaying the resources icons corresponding to the predetermined plurality of associated resources according to the state information.

27. A graphical resource management process as defined in claim 25 further comprising the step of:

including as part of the state information, information for defining the hierarchical relationships between the resource icons corresponding to the associated resources.

28. A graphical resource management process as defined in claim 25 further comprising the steps of:

including as part of the state information, icon information for each resource icon corresponding to the associated resources, the icon information for defining the relative location of the resource icon in the three-dimensional environment; and also including as part of the state information, three-dimensional point of view information for displaying from a predetermined perspective the resource icons corresponding to the associated resources.

29. A graphical resource management process as defined in claim 28 further comprising the steps of:

displaying the resource icons corresponding to the associated resources in a predetermined three-dimensional configuration with a predetermined perspective determined by the point of view information included as part of the state information.

30. A graphical resource management process executed by programmed instructions of a general purpose computer in response to input information; the general purpose computer including a memory in which the programmed instructions are recorded, an input device to supply input information for interaction with the programmed instructions, and a display device for displaying information created by the programmed instructions and the input information, said graphical resource management process comprising the steps of:

creating a display of a three-dimensional environment in a main window of the display device;

representing a plurality of resources available for use through the computer by a plurality of corresponding resource icons;

establishing predetermined different positions for each of the resource icons within the three-dimensional environment;

establishing a user's point of view within the three-dimensional environment;

displaying within the main window a field of view of the environment from the user's point of view;

displaying within the main window each of the resource icons which are visible within the field of view;

moving the user's point of view in three dimensions within the three-dimensional environment in response to input information supplied at the input device;

selecting a resource icon visible within the field of view through manipulation of the input device to activate the resource represented by the resource icon;

dividing the three-dimensional environment into a plurality of predetermined three-dimensional segments;

defining portals between separate three-dimensional segments to allow movement of the user's point of view between separate three-dimensional segments;

recording portal information in the memory describing the portals between separate three-dimensional segments; and recalling the portal information from memory to move the user's point of view between separate three-dimensional segments.

* * * * *